United States Patent
Groombridge et al.

(10) Patent No.: US 12,027,699 B2
(45) Date of Patent: Jul. 2, 2024

(54) ACTIVE ELECTRODE MATERIAL

(71) Applicant: Echion Technologies Limited, Cambridge (GB)

(72) Inventors: Alexander Groombridge, Cambridge (GB); Zhihong Cai, Cambridge (GB); Wanwei Zhang, Cambridge (GB); Joris Pezin, Cambridge (GB)

(73) Assignee: Echion Technologies Limited, Cambridge (GB)

( * ) Notice: Subject to any disclaimer, the term of this patent is extended or adjusted under 35 U.S.C. 154(b) by 0 days.

(21) Appl. No.: 18/007,912

(22) PCT Filed: Jun. 2, 2021

(86) PCT No.: PCT/GB2021/051358
§ 371 (c)(1),
(2) Date: Dec. 2, 2022

(87) PCT Pub. No.: WO2021/245411
PCT Pub. Date: Dec. 9, 2021

(65) Prior Publication Data
US 2023/0231123 A1    Jul. 20, 2023

(30) Foreign Application Priority Data

Jun. 3, 2020  (GB) ..................................... 2008352
Aug. 28, 2020 (GB) ..................................... 2013576
(Continued)

(51) Int. Cl.
*H01M 4/485* (2010.01)
*H01M 4/02* (2006.01)
(Continued)

(52) U.S. Cl.
CPC ........... *H01M 4/485* (2013.01); *H01M 4/131* (2013.01); *H01M 4/364* (2013.01); *H01M 4/366* (2013.01);
(Continued)

(58) Field of Classification Search
CPC ....... H01M 4/364; H01M 4/366; H01M 4/485
See application file for complete search history.

(56) References Cited

U.S. PATENT DOCUMENTS 4,542,083 A   9/1985  Cava et al.
6,124,057 A   9/2000  Ito et al.
(Continued)

FOREIGN PATENT DOCUMENTS

CN   102326282 A   1/2012
CN   106299329 A   1/2017
(Continued)

OTHER PUBLICATIONS

Search Report under Section 17 for Application No. GB2105082.8 dated Jun. 1, 2021.
(Continued)

*Primary Examiner* — Nathanael T Zemui
(74) *Attorney, Agent, or Firm* — Wolf, Greenfield & Sacks, P.C.

(57) ABSTRACT

The present invention provides an active electrode material comprising a mixture of (a) at least one niobium oxide and (b) at least one mixed niobium oxide; wherein the mixed niobium oxide has the composition $M1_aM2_{1-a}M3_bNb_{12-b}O_{33-c-d}Q_d$, wherein: M1 and M2 are different; M1 is selected from Mg, Ca, Sr, Y, La, Ce, Ti, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof; M2 is Mo or W; M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si,
(Continued)

Ge, Sn, Pb, P, Sb, Bi, and mixtures thereof; Q is selected from F, Cl, Br, I, N, S, Se, and mixtures thereof; $0 \leq a < 0.5$; $0 \leq b \leq 2$; $-0.5 \leq c \leq 1.65$; $0 \leq d \leq 1.65$; one or more of a, b, c and d does not equal zero; and when a, b, and d equal zero, c is greater than zero. Such materials are of interest as active electrode materials in lithium-ion or sodium-ion batteries.

27 Claims, 4 Drawing Sheets

(30) Foreign Application Priority Data

| Date | Country | Number |
|---|---|---|
| Oct. 8, 2020 | (WO) | PCT/GB2020/052485 |
| Oct. 8, 2020 | (WO) | PCT/GB2020/052486 |
| Oct. 8, 2020 | (WO) | PCT/GB2020/052487 |
| Mar. 30, 2021 | (GB) | 2104508 |
| Apr. 1, 2021 | (GB) | 2104713 |
| Apr. 9, 2021 | (GB) | 2105082 |

(51) Int. Cl.

| | |
|---|---|
| H01M 4/131 | (2010.01) |
| H01M 4/36 | (2006.01) |
| H01M 10/0525 | (2010.01) |
| H01M 10/054 | (2010.01) |

(52) U.S. Cl.
CPC ..... H01M 10/0525 (2013.01); H01M 10/054 (2013.01); *H01M 2004/021* (2013.01); *H01M 2004/027* (2013.01)

(56) References Cited

U.S. PATENT DOCUMENTS

| | | |
|---|---|---|
| 6,391,496 B1 | 5/2002 | Nakajima et al. |
| 8,647,773 B2 | 2/2014 | Goodenough et al. |
| 9,515,319 B2 | 12/2016 | Harada et al. |
| 9,698,417 B2 | 7/2017 | Buannic et al. |
| 9,806,339 B2 | 10/2017 | Nakahara et al. |
| 10,263,243 B2 | 4/2019 | Inoue et al. |
| 10,749,169 B2 | 8/2020 | Harada et al. |
| 11,721,806 B2 | 8/2023 | Groombridge et al. |
| 11,799,077 B2 | 10/2023 | Groombridge et al. |
| 2011/0206991 A1 | 8/2011 | Nakahara et al. |
| 2012/0052401 A1 | 3/2012 | Goodenough et al. |
| 2015/0010820 A1 | 1/2015 | Takami et al. |
| 2015/0086872 A1 | 3/2015 | Ise et al. |
| 2015/0270543 A1 | 9/2015 | Harada et al. |
| 2016/0087275 A1* | 3/2016 | Zhang ............... H01M 4/485 429/7 |
| 2016/0268602 A1 | 9/2016 | Inagaki et al. |
| 2017/0040643 A1 | 2/2017 | Dolle et al. |
| 2017/0077509 A1 | 3/2017 | Ise et al. |
| 2018/0083283 A1 | 3/2018 | Yamashita et al. |
| 2018/0219221 A1 | 8/2018 | Yamauchi |
| 2018/0277835 A1* | 9/2018 | Ise ............... H01M 10/052 |
| 2018/0277907 A1 | 9/2018 | Iwasaki et al. |
| 2019/0044179 A1* | 2/2019 | Sugimori ............ H01M 4/525 |
| 2019/0088941 A1* | 3/2019 | Harada ............ H01M 10/0525 |
| 2019/0252131 A1 | 8/2019 | Zhamu et al. |
| 2019/0280291 A1 | 9/2019 | Pan et al. |
| 2019/0288283 A1 | 9/2019 | Harada et al. |
| 2020/0091502 A1* | 3/2020 | Harada ............... H01M 50/296 |
| 2020/0091513 A1 | 3/2020 | Harada et al. |
| 2020/0112018 A1 | 4/2020 | Zhang et al. |
| 2020/0136148 A1 | 4/2020 | Ma et al. |
| 2020/0140339 A1 | 5/2020 | Ko et al. |
| 2020/0152963 A1* | 5/2020 | Zhang ............... H01M 4/0404 |
| 2020/0176756 A1 | 6/2020 | Fukushima et al. |
| 2020/0235384 A1 | 7/2020 | Yoshioka et al. |
| 2022/0380226 A1 | 12/2022 | Groombridge et al. |
| 2022/0384797 A1 | 12/2022 | Groombridge et al. |
| 2022/0384798 A1 | 12/2022 | Groombridge et al. |
| 2023/0071080 A1* | 3/2023 | Shivareddy ........... H01M 4/583 |
| 2023/0178719 A1 | 6/2023 | Groombridge et al. |
| 2023/0197942 A1 | 6/2023 | Groombridge et al. |
| 2023/0361288 A1 | 11/2023 | Groombridge et al. |
| 2023/0378449 A1 | 11/2023 | Groombridge et al. |
| 2023/0411613 A1 | 12/2023 | Groombridge et al. |
| 2024/0030424 A1 | 1/2024 | Groombridge et al. |

FOREIGN PATENT DOCUMENTS

| | | |
|---|---|---|
| CN | 106532109 A | 3/2017 |
| CN | 107742716 A | 2/2018 |
| CN | 108807963 A | 11/2018 |
| CN | 109167049 A | 1/2019 |
| CN | 109244443 A | 1/2019 |
| CN | 109360978 A | 1/2019 |
| CN | 109904441 A | 6/2019 |
| CN | 110137481 A | 8/2019 |
| CN | 107742716 B | 4/2020 |
| DE | 69707637 T2 | 8/2002 |
| EP | 0 853 347 A1 | 7/1998 |
| EP | 2 361 888 A2 | 8/2011 |
| EP | 2 503 625 A3 | 7/2015 |
| EP | 2 975 679 A1 | 1/2016 |
| EP | 2 980 891 A1 | 2/2016 |
| EP | 3 070 767 A1 | 6/2016 |
| EP | 3 121 878 A1 | 1/2017 |
| EP | 3 220 454 B1 | 9/2019 |
| EP | 3 539 927 A1 | 9/2019 |
| EP | 4 230 586 A1 | 8/2023 |
| GB | 2588254 A | 4/2021 |
| GB | 2588264 A | 4/2021 |
| GB | 2595745 A | 12/2021 |
| GB | 2598432 A | 3/2022 |
| GB | 2598438 A | 3/2022 |
| JP | H09-253495 A | 9/1997 |
| JP | H10-233208 A | 9/1998 |
| JP | H10-255796 A | 9/1998 |
| JP | 3390327 B2 | 3/2003 |
| JP | 3426901 B2 | 7/2003 |
| JP | 5694411 B2 | 4/2015 |
| JP | 2016-054051 A | 4/2016 |
| JP | 6200533 B2 | 9/2017 |
| KR | 20150131800 A | 11/2015 |
| WO | 2015/045254 A1 | 4/2015 |
| WO | WO 2015/138019 A1 | 9/2015 |
| WO | WO 2019/234248 A1 | 12/2019 |
| WO | WO 2019/243614 A1 | 12/2019 |
| WO | WO 2020/073915 A1 | 4/2020 |
| WO | WO 2020/098427 A1 | 5/2020 |
| WO | WO 2019/093404 A1 | 7/2020 |
| WO | WO 2021/074406 A1 | 4/2021 |
| WO | WO 2021/074592 A1 | 4/2021 |
| WO | WO 2021/074593 A1 | 4/2021 |
| WO | WO 2021/074594 A1 | 4/2021 |
| WO | WO 2021/245410 A1 | 12/2021 |

OTHER PUBLICATIONS

Griffith et al., High-Rate Intercalation without Nanostructuring in Metastable Nb2O5 Bronze Phases. J Am Chem Soc. Jul. 20, 2016;138(28):8888-99. doi: 10.1021/jacs.6b04345. Epub Jul. 10, 2016.

Saritha et al., Electrochemical Li insertion studies on WNb12O33—A shear ReO3 type structure. J Solid State Chem. May 2010;183(5):988-93.

Yan et al., Electrospun WNb12O33 nanowires: superior lithium storage capability and their working mechanism. J Mater Chem A. Apr. 10, 2017;5(19):8972-80.

Zhu et al., MoNb12O33 as a new anode material for high-capacity, safe, rapid and durable Li+ storage: structural characteristics, electrochemical properties and working mechanisms. J Mater Chem A. Mar. 2019;7(11):6522-32.

Search Report under Section 17 for Application No. GB2002487.3 dated Apr. 10, 2020.

Further Search Report under Section 17 for Application No. GB2002487.3 dated May 13, 2020.

(56) References Cited

OTHER PUBLICATIONS

Search Report under Section 17 for Application No. GB2008352.3 dated Jul. 9, 2020.
Search Report under Section 17 for Application No. GB2011681.0 dated Sep. 8, 2020.
Search Report under Section 17 for Application No. GB2013576.0 dated Oct. 20, 2020.
Search Report under Section 17 for Application No. GB2104508.3 dated Sep. 10, 2021.
Search Report under Section 17 for Application No. GB2104713.9 dated May 26, 2021.
Search Report under Section 17 for Application No. GB2105091.9 dated May 27, 2021.
International Search Report for International Application No. PCT/GB2020/052485 dated Mar. 12, 2021.
International Search Report for International Application No. PCT/GB2020/052486 dated Jan. 18, 2021.
International Search Report for International Application No. PCT/GB2020/052487 dated Mar. 12, 2021.
International Search Report and Written Opinion for International Application No., PCT/GB2021/051357 dated Aug. 9, 2021.
International Search Report and Written Opinion for International Application No. PCT/GB2021/051358 dated Aug. 9, 2021.
International Search Report for International Application No. PCT/GB2021/052228 dated Nov. 17, 2021.
Benabbas et al., Redetermination of the structure of PNb9O25. Acta Cryst. Apr. 1991;47(4):849-50.
Bergner et al., VNb9O25-δ—Synthesis, electrical conducting behaviour and density functional theory (DFT) calculation. J Solid State Chem. Aug. 2009;182(8):2053-60.
Bini et al., The Doping of FeNb11O29 as a Way to Improve Its Electrochemical Performances. ChemistrySelect. May 21, 2019;4(19):5656-61.
Cava et al., Lithium Insertion in Wadsley-Roth Phases Based on Niobium Oxide. J Electrochem Soc. Jan. 1, 1983;130(12):2345-51.
Cava et al., Lithium insertion, electrical conductivity, and chemical substitution in various crystallographic shear structures. Solid State Ionics. Dec. 1983;9-10(Part 1):407-11.
Fu et al., Design, synthesis and lithium-ion storage capability of A10.5Nb24.5O62. J Mater Chem A. Aug. 13, 2019;7(34):19862-71.
Fu et al., Highly conductive CrNb11O29 nanorods for use in high-energy, safe, fast-charging and stable lithium-ion batteries. J Power Sources. Sep. 1, 2018;397:231-9.
Glaum et al., Resource-Efficient Alkane Selective Oxidation on New Crystalline Solids: Searching for Novel Catalyst Materials. Special Issue: Innovative Technologien fur Ressourceneffizienz. Oct. 2012;84(10):1766-79.
Goodenough et al., The Li-ion rechargeable battery: a perspective. J Am Chem Soc. Jan. 30, 2013;135(4):1167-76. doi: 10.1021/ja3091438. Epub Jan. 18, 2013.
Griffith et al., Niobium tungsten oxides for high-rate lithium-ion energy storage. Nature. Jul. 2018;559(7715):556-563. doi: 10.1038/s41586-018-0347-0. Epub Jul. 25, 2018.
Griffith et al., Structural Stability from Crystallographic Shear in TiO2—Nb2O5 Phases: Cation Ordering and Lithiation Behavior of TiNb24O62. Inorg Chem. Mar. 20, 2017;56(7):4002-10.
Griffith et al., Titanium Niobium Oxide: From Discovery to Application in Fast-Charging Lithium-Ion Batteries. Chem Mater. Dec. 17, 2020;33(1):4-18.
Jayaprakash et al., A new class of tailor-made Fe0.92Mn0.08Si2 lithium battery anodes: Effect of composite and carbon coated Fe0.92Mn0.08Si2 anodes. Intermetallics. Mar. 2007:15(3):442-50.
Koçer et al., Cation Disorder and Lithium Insertion Mechanism of Wadsley-Roth Crystallographic Shear Phases from First Principles. J Am Chem Soc. Sep. 25, 2019;141(38):15121-15134. doi: 10.1021/jacs.9b06316. Epub Sep. 12, 2019.
Li et al., High-performance fuel electrodes based on NbTi0.5M0.5O4 (M=Ni, Cu) with reversible exsolution of the nano-catalyst for steam electrolysis. J Mater Chem A. May 2013;1(31):8984-93.
Li et al., Novel GaNb49O124 microspheres with intercalation pseudocapacitance for ultrastable lithium-ion storage. Ceramics International. Jun. 15, 2019;45(9):12211-7.
Lou et al., Exploration of Cr0.2Fe0.8Nb11O29 as an advanced anode material for lithium-ion batteries of electric vehicles. Electrochim Acta. Aug. 10, 2017;245:482-8.
Lou et al., GaNb11O29 Nanowebs as High-Performance Anode Materials for Lithium-Ion Batteries. ACS Appl Nano Mater. Dec. 21, 2017;1(1):183-90.
Lou et al., New Anode Material for Lithium-Ion Batteries: Aluminum Niobate (AlNb11O29). ACS Appl Mater Interfaces. Feb. 13, 2019;11(6):6089-6096. doi: 10.1021/acsami.8b20246. Epub Feb. 4, 2019. Supporting Information.
Montemayor et al., Lithium insertion in two tetragonal tungsten bronze type phases, M8W9O47 (M=Nb and Ta). J Mater Chem. 1998;8(12):2777-81.
Morcrette et al., In situ X-ray diffraction techniques as a powerful tool to study battery electrode materials. Electrochim Acta. Jul. 27, 2002;47(19):3137-49.
Patoux et al., A Reversible Lithium Intercalation Process in an ReO3 Type Structure PNb9 O 25. J Electrochem Soc. Feb. 19, 2002;149(4):A391-400.
Preefer et al., Multielectron Redox and Insulator-to-Metal Transition upon Lithium Insertion in the Fast-Charging, Wadsley-Roth Phase PNb9O25. Chem Mater. May 13, 2020;32(11):4553-63.
Qian et al., High-Rate Long-Life Pored Nanoribbon VNb9O25 Built by Interconnected Ultrafine Nanoparticles as Anode for Lithium-Ion Batteries. ACS Appl Mater Interfaces. Sep. 13, 2017;9(36):30608-30616. doi: 10.1021/acsami.7b07460. Epub Sep. 1, 2017.
Roth et al., The crystal structure of PNbO25 (P2O5.9Nb2O5). Acta Cryst. Apr. 1965;18(4):643-7.
Saritha, Electrochemical analysis of tungsten bronze-type phases, W9Nb8O47 and W7Nb4O31, synthesised by sol-gel method. Mater Sci Eng B. Feb. 2018;228:218-23.
Shannon, Revised effective ionic radii and systematic studies of interatomic distances in halides and chalcogenides. Acta Cryst. 1976; A32:751-67.
Solis et al., Adjusting the conduction properties of La0.995Ca0.005NbO4—δ by doping for proton conducting fuel cells electrode operation. Solid State Ionics. May 19, 2011;190(1):38-45.
Song et al., Mo-doped TiNb2O7 anode for lithium-ion batteries with high rate capability due to charge redistribution. Chem Commun (Camb). Jun. 18, 2015;51(48):9849-52. doi: 10.1039/c5cc02221e. Author manuscript provided. 5 pages.
Spada et al., Deepening the shear structure FeNb11O29: influence of polymorphism and doping on structural, spectroscopic and magnetic properties. Dalton Trans. Nov. 13, 2018;47(44):15816-15826. doi: 10.1039/c8dt02896f.
Stephenson, A structural investigation of some stable phases in the region Nb2O5.WO3-WO3. Acta Cryst Section B. Jan. 1, 1968;B24:637-53.
Tabero, Thermal expansion of phases formed in the system Nb2O5—MoO3. J Therm Anal Calorim. Nov. 2003;74(2):491-6.
Takashima et al., Characterization of mixed titanium-niobium oxide Ti2Nb10O29 annealed in vacuum as anode material for lithium-ion battery. J Power Sources. Feb. 15, 2015;276:113-9.
Tomaszewska et al., Lithium-ion battery fast charging: A review. eTransportation. Aug. 2019;1:100011.
Wu et al., Rational synthesis of Cr0.5Nb24.5O62 microspheres as high-rate electrodes for lithium ion batteries. J Colloid Interface Sci. Mar. 7, 2020;562:511-517. doi: 10.1016/j.jcis.2019.11.085. Epub Nov. 21, 2019.
Xiao et al., The positive effect of nitridation on CrNb49O124 nanowires for high-performance lithium-ion storage. Ceramics International. Jul. 2020;46(10):15527-33.
Xu et al., Synthesis, structure, and physical properties of niobium phosphate bronze (Nb18P2.5O50). Inorg Chem. Jan. 1, 1994;33(2):267-70.
Yang et al., Cr0.5Nb24.5O62 Nanowires with High Electronic Conductivity for High-Rate and Long-Life Lithium-Ion Storage. ACS Nano. Apr. 25, 2017;11(4):4217-4224. doi: 10.1021/acsnano.7b01163. Epub Apr. 3, 2017.

(56) References Cited

OTHER PUBLICATIONS

Yang et al., Porous ZrNb24O62 nanowires with pseudocapacitive behavior achieve high-performance lithium-ion storage. J Mater Chem A. Sep. 25, 2017;5(42):22297-304.

Yang et al., Wadsley-Roth Crystallographic Shear Structure Niobium-Based Oxides: Promising Anode Materials for High-Safety Lithium-Ion Batteries. Adv Sci (Weinh). Jun. 2021;8(12):e2004855. doi: 10.1002/advs.202004855. Epub Mar. 15, 2021.

Ye et al., Constructing Hollow Nanofibers to Boost Electrochemical Performance: Insight into Kinetics and the Li Storage Mechanism for CrNb49O124. ACS Appl Energy Mater. Mar. 12, 2019;2(4):2672-9.

Ye et al., Highly efficient lithium container based on non-Wadsley-Roth structure Nb18W16O93 nanowires for electrochemical energy storage. Electrochim Acta. Dec. 1, 2018;292:331-8. Author manuscript provided. 39 pages.

Yu et al., PNb9O25 nanofiber as a high-voltage anode material for advanced lithium ions batteries. J Materiomics. Dec. 2020;6(4):781-7. Journal Pre-proof.

Yu et al., The journey of lithium ions in the lattice of PNb9O25. Mater Chem Front. Dec. 20, 2019;4(2):631-7.

Yuan et al., Recent Advances in Titanium Niobium Oxide Anodes for High-Power Lithium-Ion Batteries. Energy Fuels. Sep. 21, 2020;34(11):13321-34. Author manuscript provided. 50 pages.

Zhai et al., Oxygen vacancy boosted the electrochemistry performance of Ti4+ doped Nb2O5 toward lithium ion battery. Appl Surf Sci. Jan. 1, 2020;499:143905.

Zheng et al., Rational construction and decoration of Fe0.5Nb24.5O62-x@C nanowires as superior anode material for lithium storage. Chem Eng J. Mar. 15, 2020;384:123314.

Zhou et al., Facile spray drying route for the Three-Dimensional Graphene-encapsulated Fe2O3 Nanoparticles for Lithium Ion Battery Anodes. Ind Eng Chem Res. 2013;52:1197-204.

Zhu et al., An inverse opal Cu2Nb34O87 anode for high-performance Li+ storage. Chem Commun (Camb). Jul. 7, 2020;56(53):7321-7324. doi: 10.1039/d0cc02016h. Epub Jun. 1, 2020. Author manuscript provided. 5 pages.

Zhu et al., Mg2Nb34O87 Porous Microspheres for Use in High-Energy, Safe, Fast-Charging, and Stable Lithium-Ion Batteries. ACS Appl Mater Interfaces. Jul. 18, 2018;10(28):23711-23720. doi: 10.1021/acsami.8b03997. Epub Jul. 5, 2018.

Zhu et al., Zinc niobate materials: crystal structures, energy-storage capabilities and working mechanisms. J Mater Chem A. Oct. 31, 2019;7(44):25537-47.

Lou et al., Crystal Structure Modification Enhanced FeNb11O29 Anodes for Lithium-Ion Batteries. ChemElectroChem. Dec. 2017;4(12):3171-80.

Examination Report under Section 18(3) for GB Application No. GB2105082.8 dated Aug. 5, 2021.

Amonpattarakit et al., X-Ray Diffraction and Zn K-Edge Xanes Studies of Perovskite Ferroelectric PZT-PZN Powders Derived from Zn2Nb34O87 Precursor. Ferroelectrics. Feb. 17, 2016;492:25-34.

Drozhzhin et al., Li-ion diffusion in LixNb9PO25. Electrochim Acta. Feb. 1, 2013;89:262-9.

Ji et al., Carbon-emcoating architecture boosts lithium storage of Nb2O5. Science China Materials. Dec. 24, 2020;64(5):1071-86.

Li et al., Electrochemical Lithium Intercalation in Monoclinic Nb12O29. Chem Mater. Apr. 14, 2011;23(9):2292-4.

Lou et al., Nb-Based Oxides as Anode Materials for Lithium Ion Batteries. Progress in Chemistry. Mar. 2015;27(2/3):297-309.

Lu et al., Investigation of Physical and Electrochemical Properties of β-TaxNb1-xPO5 as an Electrode Material for Lithium Batteries. Chem Mater. Apr. 15, 2016;28(9):2949-61.

Yang et al., Conductive Copper Niobate: Superior Li+-Storage Capability and Novel Li+-Transport Mechanism. Adv Energ Mater. Oct. 17, 2019;9(39):1902174.

International Search Report and Written Opinion for International Application No. PCT/GB2022/050820 dated Jul. 4, 2022.

GB 2105082.8, Aug. 5, 2021, Examination Report under Section 18(3).

U.S. Appl. No. 18/021,657, filed Feb. 16, 2023, Groombridge et al.
U.S. Appl. No. 18/021,661, filed Feb. 16, 2023, Groombridge et al.
U.S. Appl. No. 18/021,703, filed Feb. 16, 2023, Groombridge et al.

* cited by examiner

ACTIVE ELECTRODE MATERIAL

RELATED APPLICATIONS

This Application is a national stage filing under 35 U.S.C. § 371 of International Patent Application Serial No. PCT/GB2021/051358, filed Jun. 2, 2021, entitled "ACTIVE ELECTRODE MATERIAL," which claims priority to GB Application Number 2008352.3, filed Jun. 3, 2020; GB Application Number 2013576.0, filed Aug. 28, 2020; International Patent Application Serial No. PCT/GB2020/052485, filed Oct. 8, 2020; International Patent Application Serial No. PCT/GB2020/052486, filed Oct. 8, 2020; and International Patent Application Serial No. PCT/GB2020/052487, filed Oct. 8, 2020; GB Application Number 2104508.3, filed Mar. 30, 2021; GB Application Number 2104713.9, filed Apr. 1, 2021; GB Application Number 2105082.8, filed Apr. 9, 2021, each of which is hereby incorporated herein by reference in their entireties.

FIELD OF THE INVENTION

The present invention relates to active electrode materials and to methods for the manufacture of active electrode materials. Such materials are of interest as active electrode materials in lithium-ion or sodium-ion batteries, for example as anode materials for lithium-ion batteries.

BACKGROUND

Lithium-ion (Li-ion) batteries are a commonly used type of rechargeable battery with a global market predicted to grow to $200 bn by 2030. Li-ion batteries are the technology of choice for electric vehicles that have multiple demands across technical performance to environmental impact, providing a viable pathway for a green automotive industry.

A typical lithium-ion battery is composed of multiple cells connected in series or in parallel. Each individual cell is usually composed of an anode (negative polarity electrode) and a cathode (positive polarity electrode), separated by a porous, electrically insulating membrane (called a separator), immersed into a liquid (called an electrolyte) enabling lithium ions transport.

In most systems, the electrodes are composed of an electrochemically active material—meaning that it is able to chemically react with lithium ions to store and release them reversibly in a controlled manner—mixed if necessary with an electrically conductive additive (such as carbon) and a polymeric binder. A slurry of these components is coated as a thin film on a current collector (typically a thin foil of copper or aluminium), thus forming the electrode upon drying.

In the known Li-ion battery technology, the safety limitations of graphite anodes upon battery charging is a serious impediment to its application in high-power electronics, automotive and industry. Among a wide range of potential alternatives proposed recently, lithium titanate (LTO) and mixed niobium oxides are the main contenders to replace graphite as the active material of choice for high power, fast-charge applications.

Batteries relying on a graphitic anode are fundamentally limited in terms of charging rate. Under nominal conditions, lithium ions are inserted into the anode active material upon charging. When charging rate increases, typical graphite voltage profiles are such that there is a high risk that overpotentials lead to the potential of sites on the anode to become <0 V vs. Li/Li+, which leads to a phenomenon called lithium dendrite electroplating, whereby lithium ions instead deposit at the surface of the graphite electrode as lithium metal. This leads to irreversible loss of active lithium and hence rapid capacity fade of the cell. In some cases, these dendritic deposits can grow to such large sizes that they pierce the battery separator and lead to a short-circuit of the cell. This can trigger a catastrophic failure of the cell leading to a fire or an explosion. Accordingly, the fastest-charging batteries having graphitic anodes are limited to charging rates of 5-7 C, but often much less.

Lithium titanate (LTO) anodes do not suffer from dendrite electroplating at high charging rate thanks to their high potential (1.6 V vs. Li/Li+), and have excellent cycle life as they do not suffer from significant volume expansion of the active material upon intercalation of Li ions due to their accommodating 3D crystal structure. LTO cells are typically regarded as high safety cells for these two reasons. However, LTO is a relatively poor electronic and ionic conductor, which leads to limited capacity retention at high rate and resultant power performance, unless the material is nano-sized to increase specific surface area, and carbon-coated to increase electronic conductivity. This particle-level material engineering increases the porosity and specific surface area of the active material, and results in a significantly lower achievable packing density in an electrode. This is significant because it leads to low density electrodes and a higher fraction of electrochemically inactive material (e.g. binder, carbon additive), resulting in much lower gravimetric and volumetric energy densities.

A key measure of anode performance is the electrode volumetric capacity (mAh/cm$^3$), that is, the amount of electric charges (that is lithium ions) that can be stored per unit volume of the anode. This is an important factor to determine the overall battery energy density on a volumetric basis (Wh/L) when combined with the cathode and appropriate cell design parameters. Electrode volumetric capacity can be approximated as the product of electrode density (g/cm$^3$), active material specific capacity (mAh/g), and fraction of active material in the electrode. LTO anodes typically have relatively low specific capacities (c. 165 mAh/g, to be compared with c. 330 mAh/g for graphite) which, combined with their low electrode densities (typically <2.0 g/cm$^3$) and low active material fractions (<90%) discussed above, lead to very low volumetric capacities (<300 mAh/cm$^3$) and therefore low battery energy density and high $/kWh cost in various applications. As a result, LTO batteries/cells are generally limited to specific niche applications, despite their long cycle life, fast-charging capability, and high safety.

Niobium oxides have been proposed as active electrode materials for use in Li-ion cells. For instance, Griffith et al., J. Am. Chem. Soc. 2016, 138, 28, 8888-8899 discloses different polymorphs of $Nb_2O_5$ used as active electrode materials. However, $Nb_2O_5$ is said to have intrinsically poor electronic conductivity and to suffer from capacity decay resulting from pulverisation during charge-discharge, which limits its practical application in lithium ion batteries. Specifically, the Wadsley-Roth H—$Nb_2O_5$ polymorph exhibits the highest specific capacities, but shows the lowest capacity retention at high charge/discharge rates due to increasing impedance (cf. polarisation) effects. The low-temperature bronze-type polymorphs T-$Nb_2O_5$ and TT-$Nb_2O_5$ on the other hand show higher capacity retention at high charge/discharge rates, however suffer in their lower specific capacities. With more reduced forms of niobium oxide, such as $NbO_2$, a large increase in electrical conductivity can be shown as the material becomes semi-conducting, however the ability to intercalate Li-ions is lost as the material no longer bears the Wadsley-Roth or Bronze crystal structure types. Typical approaches to addressing these problems rely on extensive nanoscale or particle-level engineering, increasing manufacturing complexity.

Mixed niobium oxides have been proposed as active electrode materials for use in Li-ion cells. WO2019234248A1; Saritha et al., Journal of Solid State Chemistry, Volume 183, Issue 5, May 2010, Pages 988-993; and Zhu et al., J. Mater. Chem. A, 2019, 7, 6522-6532 disclose $WNb_{12}O_{33}$ and $MoNb_{12}O_{33}$ as possible active electrode materials. However, it is believed that the properties of these materials can be improved. For example, these materials may not have sufficient electronic conductivity enough to allow for efficient charging and discharging in Li-ion cells for commercial use, resulting in excess impedance. In addition, improvements can still be made in Li ion capacity, coulombic efficiency, and in tuning the voltage profile of charge and discharge. Making these improvements as described herein without the need for extensive nanoscale or particle-level engineering, and without coatings, is an important step to low-cost battery materials for mass market uptakes. If these improvements are not addressed, then there is excess electrical resistance in a resultant device and lower energy densities, leading to increased polarisation, reduced power densities, lower energy efficiencies, and increased cost.

Accordingly, there remains a need to improve the properties of niobium oxides, and of $WNb_{12}O_{33}$ and $MoNb_{12}O_{33}$ for use in lithium-ion batteries, for example when used in high-power lithium-ion batteries intended for fast charge/discharge.

SUMMARY OF THE INVENTION

In a first aspect, the invention provides an active electrode material comprising a mixture of (a) at least one niobium oxide and (b) at least one mixed niobium oxide;

wherein the mixed niobium oxide has the composition $M1_aM2_{1-a}M3_bNb_{12-b}O_{33-c-d}Q_d$, wherein:

M1 and M2 are different;

M1 is selected from Mg, Ca, Sr, Y, La, Ce, Ti, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;

M2 is Mo or W;

M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;

Q is selected from F, Cl, Br, I, N, S, Se, and mixtures thereof;

$0 \leq a < 0.5$; $0 \leq b \leq 2$; $-0.5 \leq c \leq 1.65$; $0 \leq d \leq 1.65$;

one or more of a, b, c and d does not equal zero; and when a, b, and d equal zero, c is greater than zero.

It will be understood that the composition of the mixed niobium oxide does not correspond to stoichiometric $WNb_{12}O_{33}$ or $MoNb_{12}O_{33}$. The present inventors have found that by modifying $WNb_{12}O_{33}$ or $MoNb_{12}O_{33}$ by either incorporating further cations (M1 and/or M3), and/or by creating an induced oxygen deficiency or excess, and/or by forming mixed anion materials (comprising O and Q), the resulting material has improved electrochemical properties, and in particular improved electrochemical properties when used as an anode material. When a>0, the mixed niobium oxide is modified by partial substitution of M2 (Mo or W) by M1. When b>0, the mixed niobium oxide is modified by partial substitution of Nb by M3. When c≠0, the mixed niobium oxide is modified by oxygen deficiency or excess. When d>0 the mixed niobium oxide is modified by partial substitution of O by Q. The inventors have found that the modified mixed niobium oxides have significantly improved electronic conductivity, and improved coulombic efficiency, and improved de-lithiation voltage at high C-rates, compared to unmodified 'base' materials, as shown by the present examples. This is an important result in demonstrating the advantages of the material of the invention for use in batteries designed for fast charge/discharge.

The active electrode material is a mixture of a niobium oxide and the mixed niobium oxide. Therefore, the invention represents a way of combining the improved properties of the modified mixed niobium oxide with the benefits of niobium oxides for use as active electrode materials. For instance, the combination of the invention provides a means for improving the properties of each respective material without the need to resort to extensive nanoscale or particle-level engineering, thus reducing manufacturing complexity. Moreover, the combination of the mixed niobium oxide and the niobium oxide has been found to provide a synergistic benefit compared to each individual oxide, providing an active electrode material with surprisingly improved properties for use in high-power Li-ion cells.

The active electrode material of the invention is particularly useful in electrodes, preferably for use in anodes for lithium-ion or sodium-ion batteries. Therefore, in a further implementation of the invention the active electrode material of the first aspect comprises at least one other component; optionally wherein the at least one other component is selected from a binder, a solvent, a conductive additive, a different active electrode material, and mixtures thereof. Such a composition is useful for fabricating an electrode. A further implementation of the invention is an electrode comprising the active electrode material of the first aspect in electrical contact with a current collector. A further implementation of the invention is an electrochemical device comprising an anode, a cathode, and an electrolyte disposed between the anode and the cathode, wherein the anode comprises an active electrode material according to the first aspect; optionally wherein the electrochemical device is a lithium-ion battery or a sodium-ion battery.

In a second aspect, the invention provides a method of making an active electrode material as defined by the first aspect, the method comprising mixing at least one niobium oxide with at least one mixed niobium oxide. This represents a convenient and efficient method of making the active electrode material of the first aspect.

The invention includes the combination of the aspects and features described herein except where such a combination is clearly impermissible or expressly avoided.

SUMMARY OF THE FIGURES

The principles of the invention will now be discussed with reference to the accompanying figures in which.

DETAILED DESCRIPTION OF THE INVENTION

Figure 1:
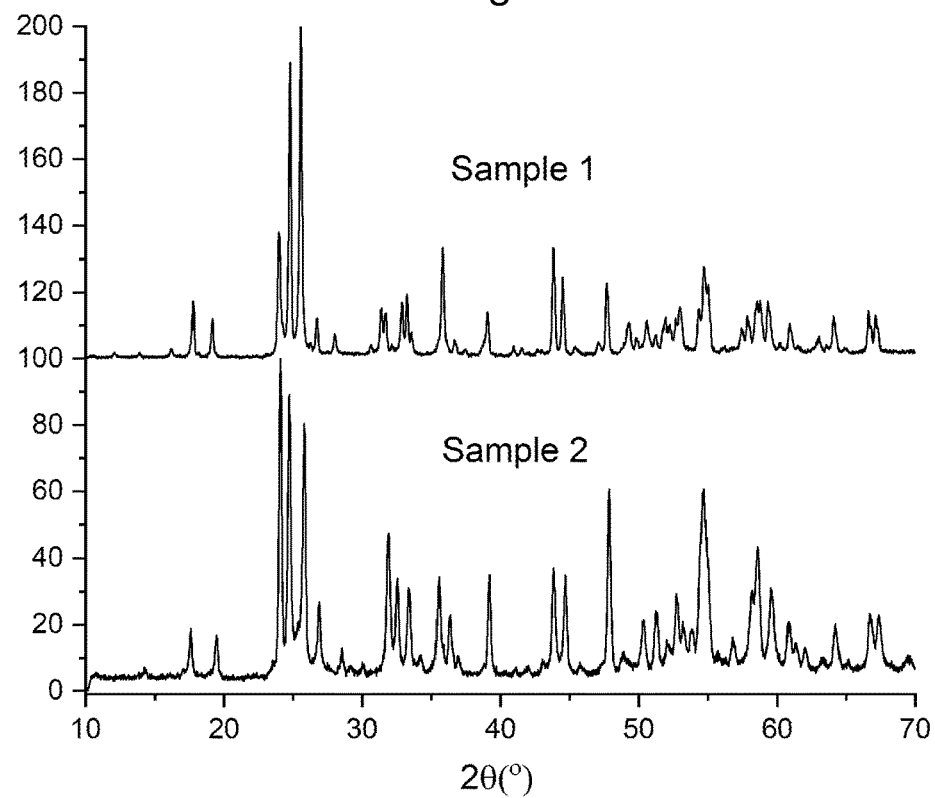
FIG. 1: Powder XRD of Samples 1* and 2* of the Examples

Aspects and embodiments of the present invention will now be discussed with reference to the accompanying figures. Further aspects and embodiments will be apparent to those skilled in the art. All documents mentioned in this text are incorporated herein by reference.

The ratio by mass of (a) the at least one niobium oxide to (b) the at least one mixed niobium oxide may be in the range of 0.5:99.5 to 99.5:0.5, or 2:98 to 98:2.

In one preferred implementation, the active electrode material comprises a higher proportion of the mixed niobium oxide than the niobium oxide, e.g. the ratio by mass of (b) to (a) is at least 1.5:1 or at least 2:1. One advantage of this implementation is that the cost of using the mixed niobium oxide in an active electrode material may be reduced by replacing some of the mixed niobium oxide (which may need custom manufacture) with niobium oxide (which is typically commercially available from many sources). Optionally, the ratio by mass of (a) to (b) is in the range of 10:90 to 40:60, or 15:85 to 35:65.

In another implementation, the active electrode material comprises a lower proportion of the mixed niobium oxide than the niobium oxide, e.g. the ratio by mass of (a) to (b) is at least 1.5:1 or at least 2:1. Optionally, the ratio by mass of (b) to (a) is in the range of 10:90 to 40:60, or 15:85 to 35:65.

The term "mixed niobium oxide" (MNO) may refer to an oxide comprising niobium and at least one other cation. MNO materials have a high redox voltage vs. Lithium >0.8V, enabling safe and long lifetime operation, crucial for fast charging battery cells. Moreover, niobium cations can have two redox reactions per atom, resulting in higher theoretical capacities than, for example, LTO. The mixed niobium oxide described herein is derived from the base structure of $WNb_{12}O_{33}$ or $MoNb_{12}O_{33}$.

$MoNb_{12}O_{33}$ and $WNb_{12}O_{33}$ may be considered to have a $ReO_3$-derived $MO_{3-x}$ crystal structure. Preferably, the mixed niobium oxide has a Wadsley-Roth crystal structure. Wadsley-Roth crystal structures are considered to be a crystallographic off-stoichiometry of the $MO_3$ ($ReO_3$) crystal structure containing crystallographic shear, with simplified formula of $MO_{3-x}$. As a result, these structures typically contain $[MO_6]$ octahedral subunits in their crystal structure alongside others. The MNO materials with these structures are believed to have advantageous properties for use as active electrode materials, e.g. in lithium-ion batteries.

The open tunnel-like $MO_3$ crystal structure of MNO materials also makes them ideal candidates for having high capacity for Li ion storage and high rate intercalation/de-intercalation. The crystallographic off-stoichiometry present in the MNO structure causes the Wadsley-Roth crystallographic superstructure. These superstructures, compounded by other qualities such as the Jahn-Teller effect and enhanced crystallographic disorder by making use of multiple mixed cations, stabilise the crystal and keep the tunnels open and stable during intercalation, enabling extremely high rate performance due to high Li-ion diffusion rates (reported as $10^{-11}$-$10^{-12}$ cm$^2$ s$^{-1}$).

The crystal formulae of $MoNb_{12}O_{33}$ or $WNb_{12}O_{33}$ can be described as having a 3×4×∞ crystallographic block structure, with corner-sharing tetrahedra ([$WO_4$] or [$MoO_4$]). The crystal formulae of $WNb_{12}O_{33}$ can be described as an isostructural phase to $MoNb_{12}O_{33}$ with slight differences in some bond lengths.

The total crystal composition of the materials described herein are preferably charge neutral and thermodynamically favourable to follow the above description. Oxygen deficient structures e.g. through introduction of oxygen vacancy point defects are preferable when reducing the material's electrical resistance such that $M_xO_y$ becomes $M_xO_{y-\delta}$. Oxygen deficient structures may contain shear defects. Structures that have had cations (i.e. Mo, W, and Nb) or anions (i.e. O) substituted may have been so with matching valency (i.e. a 5+ cation for equal proportions of a 4+ and 6+ cation) or with unmatched valency, which can induce oxygen deficiency or excess if substitution takes place at equivalent crystal sites (e.g. $Mo_{0.75}W_{0.25}Nb_{11.95}Zr_{0.05}O_{32.975}$ for deficiency, or $Mo_{0.75}W_{0.25}Nb_{11.95}Mo_{0.05}O_{33.025}$ for excess). Substitution may also take place at different crystal sites, such as interstitial sites.

The crystal structure of a material may be determined by analysis of X-ray diffraction (XRD) patterns, as is widely known. For instance, XRD patterns obtained from a given material can be compared to known XRD patterns to confirm the crystal structure, e.g. via public databases such as the ICDD crystallography database. Rietveld analysis can also be used to determine the crystal structure of materials, in particular for the unit cell parameters. Therefore, the mixed niobium oxide may have a Wadsley-Roth crystal structure, as determined by X-ray diffraction.

Preferably, the crystal structure of the mixed niobium oxide, as determined by X-ray diffraction, corresponds to the crystal structure of $WNb_{12}O_{33}$ or $MoNb_{12}O_{33}$; most preferably $MoNb_{12}O_{33}$. In this way, it can be confirmed that the 'base' material has been modified without significantly affecting the crystal structure, which is believed to have advantageous properties for use as an active electrode material. The crystal structure of $WNb_{12}O_{33}$ may be found at ICDD crystallography database entry JCPDS 73-1322.

The mixed niobium oxide with cation/anion exchange may have unit cell parameters a, b, and c wherein a is 22.23-22.43 Å preferably 22.27-22.38 Å, b is 3.81-3.84 Å preferably 3.82-3.84 Å, and c=17.7-17.9 Å preferably 17.73-17.88 Å. The mixed niobium oxide may have unit cell parameters a and γ each being about 90°, preferably wherein α=γ=90°; whereas β is 123.1-123.7° preferably 123.2-123.65° and unit cell volume is 1260-1280 Å$^3$ preferably 1264-1275 Å$^3$. Unit cell parameters may be determined by X-ray diffraction. The mixed niobium oxide may have a crystallite size of 5-150 nm, preferably 30-60 nm, determined according to the Scherrer equation.

Here the term 'corresponds' is intended to reflect that peaks in an X-ray diffraction pattern may be shifted by no more than 0.5 degrees (preferably shifted by no more than 0.25 degrees, more preferably shifted by no more than 0.1 degrees) from corresponding peaks in an X-ray diffraction pattern of the material listed above.

X-ray diffraction may also be used to determine whether an active electrode material contains a mixture of at least one niobium oxide and at least one mixed niobium oxide.

The mixed niobium oxide has the composition $M1_a M2_{1-a} M3_b Nb_{12-b} O_{33-c-d} Q_d$, wherein:

M1 and M2 are different;

M1 is selected from Mg, Ca, Sr, Y, La, Ce, Ti, Zr, Hf, V, Nb, Ta, Cr, Mo, W, Mn, Fe, Co, Ni, Cu, Zn, Cd, B, Al, Ga, In, Si, Ge, Sn, Pb, P, Sb, Bi and mixtures thereof;

M2 is Mo or W;

M3 is selected from Mg, Ca, Sr, Y, La, Ce, Ti, Zr, Hf, V, Ta, Cr, Mo, W, Mn, Fe, Co, Ni, Cu, Zn, Cd, B, Al, Ga, In, Si, Ge, Sn, Pb, P, Sb, Bi, and mixtures thereof;

Q is selected from F, Cl, Br, I, N, S, Se, and mixtures thereof;

$0 \le a < 0.5$; $0 \le b \le 2$; $-0.5 \le c \le 1.65$; $0 \le d \le 1.65$;

one or more of a, b, c and d does not equal zero; and when a, b, and d equal zero, c is greater than zero.

By 'and mixtures thereof', it is intended that M1, M3, and Q may each represent two or more elements from their respective lists. An example of such a material is $Ti_{0.05} W_{0.25} Mo_{0.70} Nb_{11.95} Al_{0.05} O_{32.9}$. Here, $M_1$ is $Ti_{a'} W_{a''}$ (where a'+a''=a), M2 is Mo, M3 is Al, a=0.3, b=0.05, c=0.1, d=0. Here, c has been calculated assuming that each cation adopts its typical oxidation state, i.e. $Al^{3+}$, $Ti^{4+}$, $W^{6+}$, $Mo^{6+}$, and $Nb^{5+}$.

The precise values of a, b, c, d within the ranges defined may be selected to provide a charge balanced, or substantially charge balanced, crystal structure. Additionally or alternatively, the precise values of a, b, c, d within the ranges defined may be selected to provide a thermodynamically stable, or thermodynamically metastable, crystal structure.

When exchange of the cations or anions in the structure (i.e. Mo, W, Nb, O) have taken place without preserving the initial valency, this can give rise to both oxygen deficiency and excess. For example, a material that substitutes $Nb^{5+}$ for $Mo^{6+}$ to some extent will demonstrate minor oxygen excess (i.e. $Nb_2O_5$ vs $MoO_3$), whereas substitution of $Nb^{5+}$ for $Al^{3+}$ will show a minor oxygen deficiency (i.e. $Nb_2O_5$ vs $Al_2O_3$). Oxygen deficiency can also be induced through thermal treatment in inert or reducing conditions, which results in induced oxygen vacancy defects in the structure.

There may be partial oxidation or partial reduction to compensate for exchange which does not preserve the initial valency. For example, substitution of $Nb^{5+}$ for $Al^{3+}$ may be compensated at least in part by reduction of some $Nb^{5+}$ to $Nb^{4+}$.

M2 is Mo or W. Preferably, M2 is Mo in which case the material is based on $MoNb_{12}O_{33}$.

M1 is a cation which substitutes for M2 in the crystal structure. M1 may be selected from Mg, Ti, Zr, Hf, V, Nb, Ta, Cr, Mo, W, Mn, Fe, Co, Ni, Cu, Zn, Cd, B, Al, Ga, Si, Sn, P, and mixtures thereof; preferably Mg, Ti, Zr, V, Nb, Cr, Mo, W, Mn, Fe, Co, Ni, Cu, Zn, Cd, B, Al, Si, P, and mixtures thereof; most preferably Ti, Zr, V, Cr, Mo, W, Fe, Cu, Zn, Al, P, and mixtures thereof. M1 may have a different valency than $M2^{6+}$. This gives rise to oxygen deficiency or excess. Preferably, M1 has a lower valency than $M2^{6+}$. This gives rise to oxygen deficiency, i.e. the presence of oxygen vacancies providing the advantages discussed herein.

M1 may also be selected from each of the specific elements used as such in the examples and reference examples.

When more than one element is present as M1 or M3 it will be understood that the valency refers to M1 or M3 as a whole. For example, if 25 at % of M1 is Ti and 75 at % of M1 is W the valency M1 is 0.25×4 (the contribution from Ti)+0.75×6 (the contribution from W).

M1 preferably has a different ionic radius than $M2^{6+}$, most preferably a larger ionic radius. This gives rise to changing unit cell size and local distortions in crystal structure, providing the advantages discussed herein. Ionic radii referred to herein are the Shannon ionic radii (available at R. D. Shannon, *Acta Cryst.*, A32, 1976, 751-767) at the coordination and valency that the ion would be expected to adopt in the crystal structure of the mixed niobium oxide. For example, the crystal structure of $MoNb_{12}O_{33}$ includes $Nb^{5+}O_6$ octahedra and $Mo^{6+}O_4$ tetrahedra. Accordingly, when M3 is Zr the ionic radius is taken as that of 6-coordinate $Zr^{4+}$ since this is typical valency and coordination of Zr when replacing Nb in $MoNb_{12}O_{33}$.

The amount of M1 is defined by a, meeting the criterion $0 \le a < 0.5$. a may be $0 \le a \le 0.45$, preferably $0 \le a \le 0.3$. Most preferably $a \ge 0$, for example $a \ge 0.01$. The inventors have found that partially substituting M2 for M1 provides a mixed niobium oxide with significantly improved properties compared to the unmodified 'base; materials, as shown by the present examples. Higher values of a may be more readily achieved when M1 has the same valency as M2. When M1 comprises a cation with a 6+ valency (for example Mo or W) a may be $0 \le a < 0.5$. When M1 does not comprise a cation with a 6+ valency a may be $0 \le a \le 0.2$.

M3 is a cation which substitutes for Nb in the crystal structure. M3 may be selected from Mg, Ti, Zr, Hf, V, Ta, Cr, Mo, W, Mn, Fe, Co, Ni, Cu, Zn, Cd, B, Al, Ga, Si, Sn, P, and mixtures thereof; preferably Mg, Ti, Zr, V, Cr, Mo, W, Mn, Fe, Co, Ni, Cu, Zn, Cd, B, Al, Si, P, and mixtures thereof; most preferably Ti, Zr, V, Cr, Mo, W, Fe, Cu, Zn, Al, P, and mixtures thereof. M3 may have a different valency than $Nb^{5+}$. This gives rise to oxygen deficiency or excess. Preferably, M3 has a lower valency than $Nb^{5+}$. This gives rise to oxygen deficiency, i.e. the presence of oxygen vacancies providing the advantages discussed herein.

M3 may also be selected from each of the specific elements used as such in the examples and reference examples.

M3 preferably has a different ionic radius than $Nb^{5+}$, most preferably a larger ionic radius. This gives rise to changing unit cell size and local distortions in crystal structure, providing the advantages discussed herein.

The amount of M3 is defined by b, meeting the criterion $0 \le b \le 2$. b may be $0 \le b \le 1.0$, preferably $0 \le b \le 0.2$. In each of these cases b may be >0, for example $b \ge 0.01$. Higher values of b may be more readily achieved when M3 has the same valency as $Nb^{5+}$. When M3 comprises a cation with a 5+ valency (for example Ta) b may be $0 \le b \le 2$. When M3 does not comprise a cation with a 5+ valency b may be $0 \le b \le 0.15$.

c reflects the oxygen content of the mixed niobium oxide. When c is greater than 0, it forms an oxygen-deficient material. Such a material may have oxygen vacancies. Such a material would not have precise charge balance without changes to cation oxygen state, but is considered to be "substantially charge balanced" as indicated above. Alternatively, c may equal 0, in which it is not an oxygen-deficient material. c may be below 0, which is a material with oxygen-excess. c may be $-0.25 \le c \le 1.65$. Preferably c is $0 \le c \le 1.65$.

When c is 1.65, the number of oxygen vacancies is equivalent to 5% of the total oxygen in the crystal structure. c may be greater than 0.0165, greater than 0.033, greater than 0.066, or greater than 0.165. c may be between 0 and 1, between 0 and 0.75, between 0 and 0.5, or between 0 and 0.25. For example, c may satisfy $0.01 \leq c \leq 1.65$. When the material is oxygen-deficient, the electrochemical properties of the material may be improved, for example, resistance measurements may show improved conductivity in comparison to equivalent non-oxygen-deficient materials. As will be understood, the percentage values expressed herein are in atomic percent.

The invention relates to mixed niobium oxides which may comprise oxygen vacancies (oxygen-deficient mixed niobium oxides), or which may have oxygen excess. Oxygen vacancies may be formed in a mixed niobium oxide by the sub-valent substitution of a base material as described above, and oxygen excess may be formed in a mixed niobium oxide by substitution for increased valency. Oxygen vacancies may also be formed by heating a mixed niobium oxide under reducing conditions, which may be termed forming induced oxygen deficiency. The amount of oxygen vacancies and excess may be expressed relative to the total amount of oxygen in the base material, i.e. the amount of oxygen in the un-substituted material (e.g. $MoNb_{12}O_{33}$).

When a, b, and d equal zero, c is greater than zero. In such cases the mixed niobium oxide has formula $M2Nb_{12}O_{33-c}$ when c is e.g. $0 < c \leq 1.65$. This represents $MoNb_{12}O_{33}$ or $WNb_{12}O_{33}$ which has been modified by induced oxygen deficiency.

A number of methods exist for determining whether oxygen deficiency, e.g. oxygen vacancies, are present in a material. For example, Thermogravimetric Analysis (TGA) may be performed to measure the mass change of a material when heated in air atmosphere. A material comprising oxygen vacancies can increase in mass when heated in air due to the material "re-oxidising" and the oxygen vacancies being filled by oxide anions. The magnitude of the mass increase may be used to quantify the concentration of oxygen vacancies in the material, on the assumption that the mass increase occurs entirely due to the oxygen vacancies being filled. It should be noted that a material comprising oxygen vacancies may show an initial mass increase as the oxygen vacancies are filled, followed by a mass decrease at higher temperatures if the material undergoes thermal decomposition. Moreover, there may be overlapping mass loss and mass gain processes, meaning that some materials comprising oxygen vacancies may not show a mass gain (and sometimes not a mass loss or gain) during TGA analysis.

Other methods of determining whether oxygen deficiency, e.g. oxygen vacancies, are present include Raman spectroscopy, electron paramagnetic resonance (EPR), X-ray photoelectron spectroscopy (XPS, e.g. of oxygen 1 s and/or and of cations in a mixed oxide), X-ray absorption near-edge structure (XANES, e.g. of cations in a mixed metal oxide), and TEM (e.g. scanning TEM (STEM) equipped with high-angle annular darkfield (HAADF) and annular bright-field (ABF) detectors). The presence of oxygen deficiency can be qualitatively determined by assessing the colour of a material relative to a non-oxygen-deficient sample of the same material, indicative of changes to its electronic band structure through interaction with light. For example, non-oxygen deficient stoichiometric $MoNb_{12}O_{33}$ has a white, off-white, or yellow colour. $MoNb_{12}O_{<33}$ with induced oxygen deficiency has a purple colour. The presence of vacancies can also be inferred from the properties, e.g. electrical conductivity, of a stoichiometric material compared to those of an oxygen-deficient material.

When d>0, additional anions Q are introduced into the mixed niobium oxide. Due to their differing electronic structure (i.e. $F^-$ vs $O^{2-}$), and differing ionic radii (6-coordinate $O^{2-}$=1.40 Å, 6-coordinate $F^-$=1.33 Å) they may improve electrochemical performance in the active material. This is due to altering unit cell characteristics with differing ionic radii allowing for improved Li ion capacity, or improved Coulombic efficiencies by improving reversibility. They may additionally improve electrical conductivity as for oxygen vacancy defects, or sub-valent cation substitutions, by altering the electronic structure of the crystal (i.e. doping effects). d may be $0 \leq d \leq 1.0$, or $0 \leq d \leq 0.8$. In each of these cases d may be >0, for example $d \geq 0.01$. Q may be selected from F, Cl, N, S, and mixtures thereof; or F, N, and mixtures thereof; or Q is N.

Q may also be selected from each of the specific elements used as such in the examples and reference examples.

Optionally d=0, in which case the material has the composition $M1_aM2_{1-a}M3_bNb_{12-b}O_{33-c}$ where M1, M2, M3, a, b, and c are as defined herein. Advantageously, materials where d=0 are free from anion Q and may be easier to synthesise.

It will be understood that the discussion of the variables of the composition (M1, M2, M3, Q, a, b, c, and d) is intended to be read in combination. For example, preferably M1 is selected from Mg, Ti, Zr, V, Nb, Cr, Mo, W, Mn, Fe, Co, Ni, Cu, Zn, Cd, B, Al, Si, P, and mixtures thereof and M3 is selected from Mg, Ti, Zr, V, Cr, Mo, W, Mn, Fe, Co, Ni, Cu, Zn, Cd, B, Al, Si, P, and mixtures thereof and Q is selected from F, N, and mixtures thereof. Most preferably M1 and M3 are selected from Ti, Zr, V, Cr, Mo, W, Fe, Cu, Zn, Al, P, and mixtures thereof. Preferably $0 \leq a \leq 0.45$ and $0 \leq b \leq 1.0$ and $0 \leq d \leq 1.0$.

For example, the mixed niobium oxide may have the composition $M1_aM2_{1-a}M3_bNb_{12-b}O_{33-c-d}Q_d$, wherein: M1 and M2 are different;
M1 is selected from Mg, Ti, Zr, V, Nb, Cr, Mo, W, Mn, Fe, Co, Ni, Cu, Zn, Cd, B, Al, Si, P, and mixtures thereof;
M2 is Mo or W;
M3 is selected from Mg, Ti, Zr, V, Cr, Mo, W, Mn, Fe, Co, Ni, Cu, Zn, Cd, B, Al, Si, P, and mixtures thereof;
Q is selected from F, N, and mixtures thereof;
$0 \leq a \leq 0.45$; $0 \leq b \leq 1.0$; $-0.5 \leq c \leq 1.65$; $0 \leq d \leq 1.0$;
one or more of a, b, c, and d does not equal 0; and
when a, b, and d equal zero, c is greater than zero.

For example, the mixed niobium oxide may have the composition $M1_aM2_{1-a}M3_bNb_{12-b}O_{33-c-d}Q_d$, wherein:
M1 and M2 are different;
M1 is selected from Ti, Zr, V, Cr, Mo, W, Fe, Cu, Zn, Al, P, and mixtures thereof;
M2 is Mo or W;
M3 is selected from Ti, Zr, V, Cr, Mo, W, Fe, Cu, Zn, Al, P, and mixtures thereof;
Q is selected from F, N, and mixtures thereof;
$0 < a \leq 0.45$; $0 \leq b \leq 0.2$; $-0.25 \leq c \leq 1.65$; $0 \leq d \leq 0.8$.

M1, M3, and Q may also be selected from each of the specific elements used as these dopants in the examples and reference examples.

The niobium oxide and/or the mixed niobium oxide may further comprise Li and/or Na. For example, Li and/or Na may enter the crystal structures of the niobium oxide and/or the mixed niobium oxide when the active electrode material is used in a metal-ion battery electrode.

The mixed niobium oxide is preferably in particulate form. The material may have a $D_{50}$ particle diameter in the range of 0.1-100 μm, or 0.5-50 μm, or 1-20 μm. These particle sizes are advantageous because they are easy to process and fabricate into electrodes. Moreover, these particle sizes avoid the need to use complex and/or expensive methods for providing nanosized particles. Nanosized particles (e.g. particles having a $D_{50}$ particle diameter of 100 nm or less) are typically more complex to synthesise and require additional safety considerations.

The mixed niobium oxide may have a $D_{10}$ particle diameter of at least 0.05 μm, or at least 0.1 μm, or at least 0.5 μm, or at least 1 μm. By maintaining a $D_{10}$ particle diameter within these ranges, the potential for parasitic reactions in a Li ion cell is reduced from having reduced surface area, and it is easier to process with less binder in the electrode slurry.

The mixed niobium oxide may have a $D_{90}$ particle diameter of no more than 200 μm, no more than 100 μm, no more than 50 μm, or no more than 20 μm. By maintaining a $D_{90}$ particle diameter within these ranges, the proportion of the particle size distribution with large particle sizes is minimised, making the material easier to manufacture into a homogenous electrode.

The term "particle diameter" refers to the equivalent spherical diameter (esd), i.e. the diameter of a sphere having the same volume as a given particle, where the particle volume is understood to include the volume of any intraparticle pores. The terms "$D_n$" and "$D_n$ particle diameter" refer to the diameter below which n % by volume of the particle population is found, i.e. the terms "$D_{50}$" and "$D_{50}$ particle diameter" refer to the volume-based median particle diameter below which 50% by volume of the particle population is found. Where a material comprises primary crystallites agglomerated into secondary particles, it will be understood that the particle diameter refers to the diameter of the secondary particles. Particle diameters can be determined by laser diffraction. Particle diameters can be determined in accordance with ISO 13320:2009, for example using Mie theory.

The mixed niobium oxide may have a BET surface area in the range of 0.1-100 $m^2/g$, or 0.5-50 $m^2/g$, or 1-20 $m^2/g$. In general, a low BET surface area is preferred in order to minimise the reaction of the mixed niobium oxide with the electrolyte, e.g. minimising the formation of solid electrolyte interphase (SEI) layers during the first charge-discharge cycle of an electrode comprising the material. However, a BET surface area which is too low results in unacceptably low charging rate and capacity due to the inaccessibility of the bulk of the mixed niobium oxide to metal ions in the surrounding electrolyte.

The term "BET surface area" refers to the surface area per unit mass calculated from a measurement of the physical adsorption of gas molecules on a solid surface, using the Brunauer-Emmett-Teller theory. For example, BET surface areas can be determined in accordance with ISO 9277:2010.

The active electrode material comprises at least one niobium oxide. The niobium oxide may comprise or consist of a material selected from $Nb_{12}O_{29}$, $NbO_2$, $NbO$, $Nb_2O_5$, and mixtures thereof. Preferably, the niobium oxide comprises $Nb_2O_5$. Optionally, at least 50 wt %, at least 60 wt %, at least 90 wt %, or 100 wt % of the at least one niobium oxide is $Nb_2O_5$.

The term "niobium oxide" may refer to a material comprising Nb and O having a crystal structure as determined by X-ray diffraction that corresponds to the crystal structure of an oxide consisting of Nb and O, for example the crystal structure of $Nb_{12}O_{29}$, $NbO_2$, $NbO$, or $Nb_2O_5$. For example, the niobium oxide may comprise a niobium oxide having the crystal structure of orthorhombic $Nb_2O_5$ or the crystal structure of monoclinic $Nb_2O_5$. Preferably, the niobium oxide comprises a niobium oxide having the crystal structure of monoclinic $Nb_2O_5$, most preferably the crystal structure of H—$Nb_2O_5$. Further information on crystal structures of $Nb_2O_5$ may be found at Griffith et al., *J. Am. Chem. Soc.* 2016, 138, 28, 8888-8899.

The niobium oxide may consist essentially of Nb and O or consist of Nb and O. The niobium oxide may comprise a niobium oxide doped with additional cations or anions, for example provided that the crystal structure of the niobium oxide corresponds to the crystal structure of an oxide consisting of Nb and O, e.g. $Nb_{12}O_{29}$, $NbO_2$, $NbO$, or $Nb_2O_5$. The niobium oxide may comprise a niobium oxide that is oxygen deficient. The niobium oxide may comprise a coating, optionally wherein the coating is selected from carbon, polymers, metals, metal oxides, metalloids, phosphates, and fluorides.

The niobium oxide may be synthesised by conventional ceramic techniques, for example solid-state synthesis or sol-gel synthesis. Alternatively, the niobium oxide may be obtained from a commercial supplier.

The niobium oxide is in preferably in particulate form. The niobium oxide may have a $D_{50}$ particle diameter in the range of 0.1-100 μm, or 0.5-50 μm, or 1-20 μm. The niobium oxide may have a $D_{10}$ particle diameter of at least 0.05 μm, or at least 0.5 μm, or at least 1 μm. The niobium oxide may have a $D_{90}$ particle diameter of no more than 100 μm, no more than 50 μm, or no more than 25 μm. By maintaining a $D_{90}$ particle diameter in this range the packing of niobium oxide particles in the mixture with mixed niobium oxide particles is improved.

The niobium oxide may have a BET surface area in the range of 0.1-100 $m^2/g$, or 1-50 $m^2/g$, or 1-20 $m^2/g$.

Optionally, the active electrode material may consist of a mixture of (a) at least one niobium oxide and (b) at least one mixed niobium oxide. Additionally, the active electrode material may consist of a mixture of (a) one niobium oxide and (b) one mixed niobium oxide.

The specific capacity/reversible delithiation capacity of the active electrode material may be 185 mAh/g or more, or 190 mAh/g or more. Here, specific capacity is defined as that measured in the 2nd cycle of a half cell galvanostatic cycling test at a rate of 0.1C with a voltage window of 1.1-3.0V vs Li/Li+ in a half cell. It may be advantageous to provide materials having a high specific capacity, as this can provide improved performance in an electrochemical device comprising the active electrode material.

When formulated or coated as an electrode according to the below description (optionally with conductive carbon additive and binder materials), the sheet resistance of the active electrode material may be 2.5 kΩ per square or less, more preferably 2.0 kΩ per square or less, which may be measured as defined in the examples. Sheet resistance can be a useful proxy measurement of the electronic conductivity of such materials. It may be advantageous to provide materials having a suitably low sheet resistance, as this can provide improved performance in an electrochemical device comprising the mixed niobium oxide.

The mixed niobium oxide may have a lithium diffusion rate greater than $10^{-14}$ $cm^2$ $s^{-1}$, or more preferably greater than $10^{-12}$ $cm^2$ $s^{-1}$. It may be advantageous to provide materials having a suitably high lithium diffusion rate, as this can provide improved performance in an electrochemical device comprising the mixed niobium oxide.

The active electrode material oxide may be able to form composite electrodes with a suitable binder and conductive additive according to the below description to provide an electrode density of 2.5 g/cm$^3$ or more after calendaring. This enables a composite electrode with an electrode porosity (calculated by the measured electrode density/average of the true density of each component) in the range of 30-40%, in-line with industrial requirements for high energy and high power cells. For example, electrode densities of up to 2.8 g/cm$^3$ have been achieved. It may be advantageous to provide materials having such an electrode density, as this can provide improved performance in an electrochemical device comprising the active electrode material. Specifically, when the electrode density is high, high volumetric capacities can be achieved, as gravimetric capacity×electrode density×active electrode material fraction=volumetric capacity.

Initial coulombic efficiency has been measured as the difference in the lithiation and de-lithiation capacity on the 1$^{st}$ charge/discharge cycle at C/10 in a half-cell. The initial coulombic efficiency of the active electrode material may be greater than 85.0%, or greater than 87.5. It may be advantageous to provide materials having a suitably high initial coulombic efficiency, as this can provide improved performance in an electrochemical device comprising the mixed niobium oxide.

The active electrode material of the first aspect of the invention may comprise at least one other component, optionally wherein the at least one other component is selected from a binder, a solvent, a conductive additive, a different active electrode material, and mixtures thereof. Such a composition is useful for preparing an electrode, e.g. an anode for a lithium-ion battery. Preferably, the different active electrode material is selected from lithium titanium oxides.

The active electrode material may further comprise a lithium titanium oxide.

The lithium titanium oxide preferably has a spinel or ramsdellite crystal structure, e.g. as determined by X-ray diffraction. An example of a lithium titanium oxide having a spinel crystal structure is $Li_4Ti_5O_{12}$. An example of a lithium titanium oxide having a ramsdellite crystal structure is $Li_2Ti_3O_7$. These materials have been shown to have good properties for use as active electrode materials. Therefore, the lithium titanium oxide may have a crystal structure as determined by X-ray diffraction corresponding to $Li_4Ti_5O_{12}$ and/or $Li_2Ti_3O_7$. The lithium titanium oxide may be selected from $Li_4Ti_5O_{12}$, $Li_2Ti_3O_7$, and mixtures thereof.

The lithium titanium oxide may be doped with additional cations or anions. The lithium titanium oxide may be oxygen deficient. The lithium titanium oxide may comprise a coating, optionally wherein the coating is selected from carbon, polymers, metals, metal oxides, metalloids, phosphates, and fluorides.

The lithium titanium oxide may be synthesised by conventional ceramic techniques, for example solid-state synthesis or sol-gel synthesis. Alternatively, the lithium titanium oxide may be obtained from a commercial supplier.

The lithium titanium oxide is in preferably in particulate form. The lithium titanium oxide may have a $D_{50}$ particle diameter in the range of 0.1-50 µm, or 0.25-20 µm, or 0.5-15 µm. The lithium titanium oxide may have a $D_{10}$ particle diameter of at least 0.01 µm, or at least 0.1 µm, or at least 0.5 µm. The lithium titanium oxide may have a $D_{90}$ particle diameter of no more than 100 µm, no more than 50 µm, or no more than 25 µm. By maintaining a $D_{90}$ particle diameter in this range the packing of lithium titanium oxide particles in the mixture with mixed niobium oxide particles is improved.

Lithium titanium oxides are typically used in battery anodes at small particle sizes due to the low electronic conductivity of the material. In contrast, the mixed niobium oxide as defined herein may be used at larger particle sizes since it typically has a higher lithium ion diffusion coefficient than lithium titanium oxide. Advantageously, in the composition the lithium titanium oxide may have a smaller particle size than the mixed niobium oxide, for example such that the ratio of the $D_{50}$ particle diameter of the lithium titanium oxide to the $D_{50}$ particle diameter of the mixed niobium oxide is in the range of 0.01:1 to 0.9:1, or 0.1:1 to 0.7:1. In this way, the smaller lithium titanium oxide particles may be accommodated in the voids between the larger mixed niobium oxide particles, increasing the packing efficiency of the composition.

The lithium titanium oxide may have a BET surface area in the range of 0.1-100 m$^2$/g, or 1-50 m$^2$/g, or 3-30 m$^2$/g.

The ratio by mass of the lithium titanium oxide to the mixed niobium oxide may be in the range of 0.5:99.5 to 99.5:0.5, preferably in the range of 2:98 to 98:2. In one implementation the active electrode material comprises a higher proportion of the lithium titanium oxide than the mixed niobium oxide, e.g. the ratio by mass of at least 2:1, at least 5:1, or at least 8:1. Advantageously, this allows the mixed niobium oxide to be incrementally introduced into existing electrodes based on lithium titanium oxides without requiring a large change in manufacturing techniques, providing an efficient way of improving the properties of existing electrodes. In another implementation the active electrode material has a higher proportion of the mixed niobium oxide than the lithium titanium oxide, e.g. such that the ratio by mass of the lithium titanium oxide to the mixed niobium oxide is less than 1:2, or less than 1:5, or less than 1:8. Advantageously, this allows for the cost of the active electrode material to be reduced by replacing some of the mixed niobium oxide with lithium titanium oxide.

The invention also provides an electrode comprising the active electrode material of the first aspect of the invention in electrical contact with a current collector. The electrode may form part of a cell. The electrode may form an anode as part of metal-ion battery, optionally a lithium-ion battery.

The invention also provides the use of the active electrode material of the first aspect of the invention in an anode for a metal-ion battery, optionally wherein the metal-ion battery is a lithium-ion battery.

A further implementation of the invention is an electrochemical device comprising an anode, a cathode, and an electrolyte disposed between the anode and the cathode, wherein the anode comprises an active electrode material according to the first aspect of the invention; optionally wherein the electrochemical device is metal-ion battery such as a lithium-ion battery or a sodium-ion battery. Preferably, the electrochemical device is a lithium-ion battery having a reversible anode active material specific capacity of greater than 200 mAh/g at 20 mA/g, wherein the battery can be charged and discharged at current densities relative to the anode active material of 200 mA/g or more, or 1000 mA/g or more, or 2000 mA/g or more, or 4000 mA/g or more whilst retaining greater than 70% of the initial cell capacity at 20 mA/g. It has been found that use of the active electrode materials of the first aspect of the invention can enable the production of a lithium-ion battery with this combination of properties, representing a lithium-ion battery that is particularly suitable for use in applications where high charge and discharge current densities are desired. Notably, the examples have shown that active electrode materials according to the first aspect of the invention have improved electronic conductivity and improved delithiation voltage at high C-rates.

The mixed niobium oxide may be synthesised by conventional ceramic techniques. For example, the material be made by one or more of solid-state synthesis or sol-gel synthesis. The material may additionally be synthesised by one or more of alternative techniques commonly used, such as hydrothermal or microwave hydrothermal synthesis, solvothermal or microwave solvothermal synthesis, coprecipitation synthesis, spark or microwave plasma synthesis, combustion synthesis, electrospinning, and mechanical alloying.

The mixed niobium oxide may be made by a method comprising steps of: providing one or more precursor materials; mixing said precursor materials to form a precursor material mixture; and heat treating the precursor material mixture in a temperature range from 400° C.-1350° C. or 800-1350° C., thereby providing the mixed niobium oxide.

To provide a mixed niobium oxide comprising element Q the method may further comprise the steps of: mixing the mixed niobium oxide with a precursor comprising element Q to provide a further precursor material mixture; and heat treating the further precursor material mixture in a temperature range from 300-1200° C. or 800-1200° C. optionally under reducing conditions, thereby providing the mixed niobium oxide comprising element Q.

For example, to provide a mixed niobium oxide comprising N as element Q, the method may further comprise the steps of: mixing the mixed niobium oxide with a precursor comprising N (for example melamine) to provide a further precursor material mixture; and heat treating the further precursor material mixture in a temperature range from 300-1200° C. under reducing conditions (for example in $N_2$), thereby providing the mixed niobium oxide comprising N as element Q.

For example, to provide a mixed niobium oxide comprising F as element Q, the method may further comprise the steps of: mixing the mixed niobium oxide with a precursor comprising F (for example polyvinylidene fluoride) to provide a further precursor material mixture; and heat treating the further precursor material mixture in a temperature range from 300-1200° C. under oxidising conditions (for example in air), thereby providing the mixed niobium oxide comprising F as element Q.

The method may comprise the further step of heat treating the mixed niobium oxide or the mixed niobium oxide comprising element Q in a temperature range from 400-1350° C. or 800-1350° C. under reducing conditions, thereby inducing oxygen vacancies in the mixed niobium oxide. The induced oxygen vacancies may be in addition to oxygen vacancies already present in the mixed niobium oxide, e.g. already present due to sub-valent substitution of M2 and/or Nb with M1 and/or M3. Alternatively, the induced oxygen vacancies may be new oxygen vacancies, e.g. if M1 and M3 have the same valency as M2 and Nb. The presence of induced oxygen vacancies provides the advantages discussed herein.

The precursor materials may include one or more metal oxides, metal hydroxides, metal salts or ammonium salts. For example, the precursor materials may include one or more metal oxides or metal salts of different oxidation states and/or of different crystal structure. Examples of suitable precursor materials include but are not limited to: $Nb_2O_5$, $Nb(OH)_5$, Niobic Acid, NbO, Ammonium Niobate Oxalate, $NH_4H_2PO_4$, $(NH_4)_2PO_4$, $(NH_4)_3PO_4$, $P_2O_5$, $H_3PO_3$, $Ta_2O_5$, $WO_3$, $ZrO_2$, $TiO_2$, $MoO_3$, $V_2O_5$, $ZrO_2$, $CuO$, $ZnO$, $Al_2O_3$, $K_2O$, KOH, CaO, $GeO_2$, $Ga_2O_3$, $SnO_2$, CoO, $Co_2O_3$, $Fe_2O_3$, $Fe_3O_4$, MnO, $MnO_2$, NiO, $Ni_2O_3$, $H_3BO_3$, ZnO, and MgO. The precursor materials may not comprise a metal oxide, or may comprise ion sources other than oxides. For example, the precursor materials may comprise metal salts (e.g. $NO_3^-$, $SO_3^-$) or other compounds (e.g. oxalates, carbonates). For the substitution of the oxygen anion with other electronegative anions Q, the precursors comprising element Q may include one or more organic compounds, polymers, inorganic salts, organic salts, gases, or ammonium salts. Examples of suitable precursor materials comprising element Q include but are not limited to: melamine, $NH_4HCO_3$, $NH_3$, $NH_4F$, PVDF, PTFE, $NH_4Cl$, $NH_4Br$, $NH_4I$, $Br_2$, $Cl_2$, $I_2$, ammonium oxychloride amide, and hexamethylenetetramine.

Some or all of the precursor materials may be particulate materials. Where they are particulate materials, preferably they have a $D_{50}$ particle diameter of less than 20 μm in diameter, for example from 10 nm to 20 μm. Providing particulate materials with such a particle diameter can help to promote more intimate mixing of precursor materials, thereby resulting in more efficient solid-state reaction during the heat treatment step. However, it is not essential that the precursor materials have an initial particle size of <20 μm in diameter, as the particle size of the one or more precursor materials may be mechanically reduced during the step of mixing said precursor materials to form a precursor material mixture.

The step of mixing the precursor materials to form a precursor material mixture and/or further precursor material mixture may be performed by a process selected from (but not limited to): dry or wet planetary ball milling, rolling ball milling, high energy ball milling, high shear milling, air jet milling, steam jet milling, planetary mixing, and/or impact milling. The force used for mixing/milling may depend on the morphology of the precursor materials. For example, where some or all of the precursor materials have larger particle sizes (e.g. a $D_{50}$ particle diameter of greater than 20 μm), the milling force may be selected to reduce the particle diameter of the precursor materials such that the such that the particle diameter of the precursor material mixture is reduced to 20 μm in diameter or lower. When the particle diameter of particles in the precursor material mixture is 20 μm or less, this can promote a more efficient solid-state reaction of the precursor materials in the precursor material mixture during the heat treatment step. The solid state synthesis may also be undertaken in pellets formed at high pressure (>10 MPa) from the precursor powders.

The step of heat treating the precursor material mixture and/or the further precursor material mixture may be performed for a time of from 1 hour to 24 hours, more preferably from 3 hours to 18 hours. For example, the heat treatment step may be performed for 1 hour or more, 2 hours or more, 3 hours or more, 6 hours or more, or 12 hours or more. The heat treatment step may be performed for 24 hours or less, 18 hours or less, 16 hours or less, or 12 hours or less.

The step of heat treating the precursor material mixture may be performed in a gaseous atmosphere, preferably air. Suitable gaseous atmospheres include: air, $N_2$, Ar, He, $CO_2$, CO, $O_2$, $H_2$, $NH_3$ and mixtures thereof. The gaseous atmosphere may be a reducing atmosphere. Where it is desired to make an oxygen-deficient material, preferably the step of heat treating the precursor material mixture is performed in an inert or reducing atmosphere.

The step of heat treating the further precursor material mixture is performed under reducing conditions. Reducing conditions include under an inert gas such as nitrogen, helium, argon; or under a mixture of an inert gas and hydrogen; or under vacuum. Preferably, the step of heat treating the further precursor material mixture comprises heating under inert gas.

The further step of heat treating the mixed niobium oxide and/or the mixed niobium oxide comprising element Q under reducing conditions may be performed for a time of from 0.5 hour to 24 hours, more preferably from 2 hours to 18 hours. For example, the heat treatment step may be performed for 0.5 hour or more, 1 hours or more, 3 hours or more, 6 hours or more, or 12 hours or more. The further step heat treating may be performed for 24 hours or less, 18 hours or less, 16 hours or less, or 12 hours or less. Reducing conditions include under an inert gas such as nitrogen, helium, argon; or under a mixture of an inert gas and hydrogen; or under vacuum. Preferably heating under reducing conditions comprises heating under inert gas.

In some methods it may be beneficial to perform a two-step heat treatment. For example, the precursor material mixture and/or the further precursor material mixture may be heated at a first temperature for a first length of time, follow by heating at a second temperature for a second length of time. Preferably the second temperature is higher than the first temperature. Performing such a two-step heat treatment may assist the solid-state reaction to form the desired crystal structure. This may be carried out in sequence, or may be carried out with an intermediate re-grinding step.

The method may include one or more post-processing steps after formation of the mixed niobium oxide. In some cases, the method may include a post-processing step of heat treating the mixed niobium oxide, sometimes referred to as 'annealing'. This post-processing heat treatment step may be performed in a different gaseous atmosphere to the step of heat treating the precursor material mixture to form the mixed niobium oxide. The post-processing heat treatment step may be performed in an inert or reducing gaseous atmosphere. Such a post-processing heat treatment step may be performed at temperatures of above 500° C., for example at about 900° C. Inclusion of a post-processing heat treatment step may be beneficial to e.g. form deficiencies or defects in the mixed niobium oxide, for example to induce oxygen deficiency; or to carry out anion exchange on the formed mixed niobium oxide e.g. N exchange for the O anion.

The method may include a step of milling and/or classifying the mixed niobium oxide (e.g. impact milling, jet milling, steam jet milling, high energy milling, high shear milling, pin milling, air classification, wheel classification, sieving) to provide a material with any of the particle size parameters given above.

There may be a step of carbon coating the mixed niobium oxide to improve its surface electrical conductivity, or to prevent reactions with electrolyte. This is typically comprised of combining the mixed niobium oxide with a carbon precursor to form an intermediate material that may comprise milling, preferably high energy milling. Alternatively or in addition, the step may comprise mixing the mixed niobium oxide with the carbon precursor in a solvent, such as water, ethanol or THF. These represent efficient methods of ensuring uniform mixing of the mixed niobium oxide with the carbon precursor.

It has been found that a carbon precursor comprising polyaromatic $sp^2$ carbon provides a particularly beneficial carbon coating on mixed niobium oxides of the first aspect of the invention. Therefore, the method of making a mixed niobium oxide may further comprise the steps of: combining the mixed niobium oxide or the mixed niobium oxide comprising element Q with a carbon precursor comprising polyaromatic $sp^2$ carbon to form an intermediate material; and heating the intermediate material under reducing conditions to pyrolyse the carbon precursor forming a carbon coating on the mixed niobium oxide and inducing oxygen vacancies in the mixed niobium oxide.

The intermediate material may comprise the carbon precursor in an amount of up to 25 wt %, or 0.1-15 wt %, or 0.2-8 wt %, based on the total weight of the mixed niobium oxide and the carbon precursor. The carbon coating on the mixed niobium oxide may be present in an amount of up to 10 wt %, or 0.05-5 wt %, or 0.1-3 wt %, based on the total weight of the mixed niobium oxide. These amounts of the carbon precursor and/or carbon coating provide a good balance between improving the electronic conductivity by the carbon coating without overly reducing the capacity of the mixed niobium oxide by overly reducing the proportion of the mixed niobium oxide. The mass of carbon precursor lost during pyrolysis may be in the range of 30-70 wt %.

The step of heating the intermediate material under reducing conditions may be performed at a temperature in the range of 400-1,200° C., or 500-1,100° C., or 600-900° C. The step of heating the intermediate material under reducing conditions may be performed for a duration within the range of 30 minutes to 12 hours, 1-9 hours, or 2-6 hours.

The step of heating the intermediate material under reducing conditions may be performed under an inert gas such as nitrogen, helium, argon; or may be performed under a mixture of an inert gas and hydrogen; or may be performed under vacuum.

The carbon precursor comprising polyaromatic $sp^2$ carbon may be selected from pitch carbons, graphene oxide, graphene, and mixtures thereof. Preferably, the carbon precursor comprising polyaromatic $sp^2$ carbon is selected from pitch carbons, graphene oxide, and mixtures thereof. Most preferably, the carbon precursor comprising polyaromatic $sp^2$ carbon is selected from pitch carbons. The pitch carbons may be selected from coal tar pitch, petroleum pitch, mesophase pitch, wood tar pitch, isotropic pitch, bitumen, and mixtures thereof.

Pitch carbon is a mixture of aromatic hydrocarbons of different molecular weights. Pitch carbon is a low cost by-product from petroleum refineries and is widely available. The use of pitch carbon is advantageous because pitch has a low content of oxygen. Therefore, in combination with heating the intermediate material under reducing conditions, the use of pitch favours the formation of oxygen vacancies in the mixed niobium oxide.

Other carbon precursors typically contain substantial amounts of oxygen. For example, carbohydrates such as glucose and sucrose are often used as carbon precursors. These have the empirical formula $C_m(H_2O)_n$ and thus contain a significant amount of covalently-bonded oxygen (e.g. sucrose has the formula $C_{12}H_{22}O_{11}$ and is about 42 wt % oxygen). The pyrolysis of carbon precursors which contain substantial amounts of oxygen is believed to prevent or inhibit reduction of a mixed niobium oxide, or even lead to oxidation, meaning that oxygen vacancies may not be induced in the mixed niobium oxide. Accordingly, the carbon precursor may have an oxygen content of less than 10 wt %, preferably less than 5 wt %.

The carbon precursor may be substantially free of $sp^3$ carbon. For example, the carbon precursor may comprise less than 10 wt % sources of $sp^3$ carbon, preferably less than 5 wt % sources of $sp^3$ carbon. Carbohydrates are sources of $sp^3$ carbon. The carbon precursor may be free of carbohydrates. It will be understood that some carbon precursors used in the invention may contain impurities of $sp^3$ carbon, for example up to 3 wt %.

The mixed niobium oxide may comprise a carbon coating. Preferably the carbon coating comprises polyaromatic $sp^2$ carbon. Such a coating is formed by pyrolysing a carbon precursor comprising polyaromatic $sp^2$ carbon, preferably under reducing conditions, since the $sp^2$ hybridisation is largely retained during pyrolysis. Typically, pyrolysis of a polyaromatic $sp^2$ carbon precursor under reducing conditions results in the domains of $sp^2$ aromatic carbon increasing in size. Accordingly, the presence of a carbon coating comprising polyaromatic $sp^2$ may be established via knowledge of the precursor used to make the coating. The carbon coating may be defined as a carbon coating formed from pyrolysis of a carbon precursor comprising polyaromatic $sp^2$ carbon. Preferably, the carbon coating is derived from pitch carbons.

The presence of a carbon coating comprising polyaromatic $sp^2$ carbon may also be established by routine spectroscopic techniques. For instance, Raman spectroscopy provides characteristic peaks (most observed in the region 1,000-3,500 $cm^{-1}$) which can be used to identify the presence of different forms of carbon. A highly crystalline sample of $sp^3$ carbon (e.g. diamond) provides a narrow characteristic peak at ~1332 $cm^{-1}$. Polyaromatic $sp^2$ carbon typically provides characteristic D, G, and 2D peaks. The relative intensity of D and G peaks ($I_D/I_G$) can provide information on the relative proportion of $sp^2$ to $sp^3$ carbon. The mixed niobium oxide may have an $I_D/I_G$ ratio as observed by Raman spectroscopy within the range of 0.85-1.15, or 0.90-1.10, or 0.95-1.05.

X-ray diffraction may also be used to provide information on the type of carbon coating. For example, an XRD pattern of a mixed niobium oxide with a carbon coating may be compared to an XRD pattern of the uncoated mixed niobium oxide and/or to an XRD pattern of a pyrolysed sample of the carbon precursor used to make the carbon coating.

The carbon coating may be semi-crystalline. For example, the carbon coating may provide a peak in an XRD pattern of the mixed niobium oxide centred at 2θ of about 26° with a width (full width at half maximum) of at least 0.20°, or at least 0.25°, or at least 0.30°.

In the second aspect, the invention provides a method for making an active electrode material, wherein the active electrode material is as defined in the first aspect, the method comprising mixing at least one niobium oxide with at least one mixed niobium oxide. The niobium oxide and the mixed niobium oxide are as defined above.

The step of mixing at least one niobium oxide with at least one mixed niobium oxide may comprise low to high energy powder mixing/blending techniques, such as rotational mixing in multiple directions, rotational V-type blending over a single axis, planetary mixing, centrifugal planetary mixing, and high shear mixing.

The step of mixing at least one niobium oxide with at least one mixed niobium oxide may comprise mixing in a carrier solvent.

Prior to mixing, the method may include the step of milling and/or classifying the niobium oxide, e.g. to provide any of the particle size parameters given above. Prior to mixing, the method may include the step of milling and/or classifying the mixed niobium oxide, e.g. to provide any of the particle size parameters given above. The method may include a step of milling and/or classifying the mixture of the niobium oxide and the mixed niobium oxide. The milling and/or classifying may be performed by impact milling or jet milling.

EXAMPLES

The following Examples demonstrate the advantages in providing a mixture of a niobium oxide with a mixed niobium oxide for use in Li-ion battery anodes. It would be expected that the same advantages would be seen with variations of the mixed niobium oxides and the niobium oxides in accordance with the invention.

The mixed niobium oxide was synthesised by a solid-state route. In a first step precursor materials ($Nb_2O_5$, $MoO_3$, $Al_2O_3$, $TiO_2$, $WO_3$, $ZrO_2$) were mixed in stoichiometric proportions (50 g total) and ball-milled at 350 rpm with a ball to powder ratio of 10:1 for 1 h. The resulting powders were heat treated in an alumina crucible in a muffle furnace in air at $T_1$=800-1350° C. for 0.5-12 h. An additional heat treatment step may be applied in a $N_2$ atmosphere at $T_2$=800-1350° C. for 0.5-12 h. For inclusion of $F^-$ in Sample 8*, there was an additional milling/mixing step with the precursor (PVDF in a 1:10 mass ratio) prior to additional heat treatment in air atmosphere at $T_3$=300-1200° C. for 1-24 h. H—$Nb_2O_5$ was obtained from a commercial supplier, and was heat treated in air at 500° C. for 30 mins to remove any residual organic impurities, followed by ball-milling as above for 4 h to provide a smaller particle size distribution for use in electrodes. Samples 3-7 were prepared by combining samples 1*, 8*, or 9* with sample 2* at different mass ratios in an impact mill at 10,000 rpm for 2 mins. Particle Size Distributions were obtained with a Horiba laser diffraction particle analyser for dry powder. Air pressure was kept at 0.3 MPa. The results are set out in Table 1.

TABLE 1

| Sample | Material | $T_1$ (° C.; h) | $T_2$ (° C.; h) | $T_3$ (° C.; h) | D10 (μm) | D50 (μm) | D90 (μm) |
|---|---|---|---|---|---|---|---|
| 1* | $Ti_{0.05}Zr_{0.05}Mo_{0.65}W_{0.25}Nb_{12}O_{32.9-x}$ | 1200; 12 | 900; 5 | — | 3.7 | 6.5 | 11.7 |
| 2* | H—$Nb_2O_5$ | — | — | — | 1.2 | 4.5 | 9.8 |
| 3 | 25:75 w/w % mixture of 1:2 | — | — | — | 2.5 | 4.8 | 8.1 |
| 4 | 50:50 w/w % mixture of 1:2 | — | — | — | 2.8 | 5.3 | 9.2 |
| 5 | 75:25 w/w % mixture of 1:2 | — | — | — | 3.3 | 6.0 | 10.3 |
| 6 | 50:50 w/w % mixture of 8:2 | — | — | — | 2.4 | 5.5 | 10.4 |
| 7 | 50:50 w/w % mixture of 9:2 | — | — | — | 2.3 | 4.9 | 8.8 |
| 8* | $Mo_{0.75}W_{0.25}Nb_{11.9}Zr_{0.1}O_{32.95-y}F_y$ | 900; 12 | 950; 5 | 375; 24 h | 0.8 | 5.5 | 16.7 |
| 9* | $Mo_{0.75}W_{0.25}Nb_{11.95}Al_{0.05}O_{32.95}$ | 900; 12 | — | — | 1.3 | 4.7 | 10.3 |

*Comparative sample

Materials Characterisation

The phase purity of samples was analysed using a Rigaku Miniflex powder X-ray diffractometer in 2θ range (10-70°) at 1°/min scan rate. FIG. 1 shows the measured XRD diffraction patterns for Samples 1* and 2*. Diffraction patterns have peaks at the same locations (with some shift due to crystal modification, up to around 0.2°), and match ICDD crystallography database entry JCPDS, which corresponds to JCPDS 73-1322 (Sample 1*), and JCPDS 37-1468 (Sample 2*). There is no amorphous background noise and the peaks are sharp and intense. This means that all samples are crystalline, and crystal structure matching $MoNb_{12}O_{33}$ or the isostructural $WNb_{12}O_{33}$ for Sample 1*, and $Nb_2O_5$ for Sample 2*. This confirms the presence of a Wadsley-Roth crystal structure. Table 2 provides a summary table of unit cell parameters for Sample 1* and 9* calculated by Rietveld refinement of the powder XRD spectra with software GSASII, $\chi^2$ represents the goodness of fit and is a representation of how accurate the Rietveld refinement is, a value≤10 supports the accuracy of the data.

TABLE 2

| Sample | a [Å] | b [Å] | c [Å] | β [°] | Vol(Å³) | $\chi^2$ | Crystallite size [nm] |
|---|---|---|---|---|---|---|---|
| Reference | 22.370 | 3.825 | 17.870 | 123.60 | 1273.58 | — | — |
| 1* | 22.355 | 3.836 | 17.810 | 123.33 | 1276.228 | 8.0 | 47 |
| 9* | 22.312 | 3.836 | 17.786 | 123.29 | 1271.26 | 9 | 40.2 |

Electrochemical Characterisation

Li-ion cell charge rate is usually expressed as a "C-rate". A 1C charge rate means a charge current such that the cell is fully charged in 1 h, 10C charge means that the battery is fully charged in 1/10th of an hour (6 minutes). C-rate hereon is defined from the reversible capacity observed of the anode within the voltage limits applied in its second cycle de-lithiation, i.e. for an anode that exhibits 1.0 mAh $cm^{-2}$ capacity within the voltage limits of 1.1-3.0 V, a 1C rate corresponds to a current density applied of 1.0 mA $cm^{-2}$. In a typical MNO material as described herein, this corresponds to ~200 mA/g of active material.

Electrochemical tests were carried out in half-coin cells (CR2032 size) for analysis. In half-coin tests, the active material is tested in an electrode versus a Li metal electrode to assess its fundamental performance. In the below examples, the active material composition to be tested was combined with N-Methyl Pyrrolidone (NMP), carbon black (Super P) acting as a conductive additive, and poly(vinyldifluoride) (PVDF) binder and mixed to form a slurry using a lab-scale centrifugal planetary mixer. The non-NMP composition of the slurries was 90 wt % active material, 6 wt % conductive additive, 4 wt % binder. The slurry was coated on an Al foil current collector to the desired loading of 58-63 g $m^{-2}$ by doctor blade coating and dried by heating. The electrodes were then calendared at 80° C. to achieve targeted porosities of 35-40%, corresponding to a density of 2.7-2.8 g $cm^{-3}$. Electrodes were punched out at the desired size and combined with a separator (Celgard porous PP/PE), Li metal, and electrolyte (1.3 M $LiPF_6$ in EC/DEC) inside a steel coin cell casing and sealed under pressure. Cycling was then carried out at 23° C. at low current rates (C/10) for 2 full cycles of lithiation and de-lithiation between 1.1-3.0 V. Afterwards, the cells were tested for their performance at increasing current densities. During these tests, the cells were cycled asymmetric at 23° C., with a slow lithiation (C/5) followed by increasing de-lithiation rates (e.g. 1C, 5C, 10C, 20C) to provide the capacity and nominal voltage at these higher rates. Nominal voltage vs Li/Li+ has been calculated from the integral of the V/Q curve divided by the total capacity at 5C during de-lithiation. No constant voltage steps were used. Data has been averaged from 5≤cells prepared from the same electrode coating, with the error shown from the standard deviation. Accordingly, the data represent a robust study showing the improvements achieved by the mixtures compared to reference materials.

Homogeneous, smooth coatings on both Cu and Al current collector foils, the coatings being free of visible defects or aggregates may also be prepared as above for these samples with a centrifugal planetary mixer to a composition of up to 94 wt % active material, 4 wt % conductive additive, 2 wt % binder. These can be prepared with both PVDF (i.e. NMP-based) and CMC:SBR-based (i.e. water-based) binder systems. The coatings can be calendared at 80° C. for PVDF and 50° C. for CMC:SBR to porosities of 35-40% at loadings from 1.0 to 5.0 mAh $cm^{-2}$. This is important to demonstrate the viability of these materials in both high energy and high-power applications, with high active material content.

TABLE 3

| Sample | Lithiation specific capacity $1^{st}$ C/10 cycle [mAh/g] | $1^{st}$ cycle irreversible loss in capacity [mAh/g] | Delithiation specific capacity $2^{nd}$ C/10 cycle [mAh/g] | Nominal de-lithiation voltage at 5 C vs Li/Li+ [V] |
|---|---|---|---|---|
| 1* | 217.2 ± 0.7 | 31.0 ± 0.2 | 185.3 ± 0.5 | 1.87 ± 0.00 |
| 2* | 233.4 ± 4.0 | 10.8 ± 0.4 | 220.2 ± 3.0 | 1.97 ± 0.04 |
| 3 | 225.3 ± 2.0 | 16.3 ± 0.2 | 210.7 ± 2.8 | 1.82 ± 0.01 |
| 4 | 222.6 ± 3.2 | 19.7 ± 2.5 | 202.4 ± 1.1 | 1.85 ± 0.02 |
| 5 | 221.0 ± 1.3 | 26.6 ± 0.6 | 192.4 ± 1.8 | 1.86 ± 0.02 |
| 6 | 230.9 ± 3.9 | 18.7 ± 0.0 | 211.5 ± 2.5 | 1.84 ± 0.01 |
| 7 | 224.5 ± 4.9 | 17.8 ± 0.1 | 207.3 ± 1.4 | 1.84 ± 0.00 |
| 8* | 229.2 ± 8.3 | 22.1 ± 0.7 | 205.1 ± 7.5 | 1.89 ± 0.01 |
| 9* | 227.9 ± 2.3 | 26.5 ± 0.2 | 201.2 ± 2.5 | 1.90 ± 0.01 |

*Comparative sample

TABLE 4

| Sample | De-lithiation specific capacity 1 C [mAh/g] | De-lithiation specific capacity 5 C [mAh/g] | De-lithiation specific capacity 10 C [mAh/g] | De-lithiation specific capacity 20 C [mAh/g] |
|---|---|---|---|---|
| 1* | 169 ± 1 | 162 ± 2 | 158 ± 2 | 133 ± 4 |
| 2* | 195 ± 3 | 181 ± 3 | 143 ± 6 | 57 ± 10 |
| 3 | 192 ± 2 | 184 ± 2 | 178 ± 2 | 149 ± 5 |
| 4 | 184 ± 1 | 176 ± 1 | 171 ± 1 | 147 ± 4 |
| 5 | 175 ± 3 | 167 ± 7 | 162 ± 10 | 142 ± 2 |

*Comparative sample

DISCUSSION

Comparative Sample 1* is a $MoNb_{12}O_{33}$-based mixed niobium oxide which has been modified by the exchange of cations and induced oxygen deficiency. Further examples of modified mixed niobium oxides are provided in the Reference Examples below, which demonstrate the surprising improvement provided by the modified mixed niobium oxides over the base mixed niobium oxide.

Comparative Sample 2* is $H-Nb_2O_5$ that has undergone minor preparations as described to make it representative and suitable for comparable electrochemical testing (e.g. free from contaminants, appropriate particle size), and suitable for combination with sample 1*.

Sample 2* demonstrates higher specific capacity at charge/discharge rates of 10C and below than Sample 1*, and lower $1^{st}$ cycle irreversible loss of specific capacity than Sample 1*, in the cycling conditions used (e.g. 1.1-3.0 V). Sample 1* demonstrates higher specific capacity than Sample 2* at high (10C+) charge/discharge rates in the formulations used.

Figure 2:
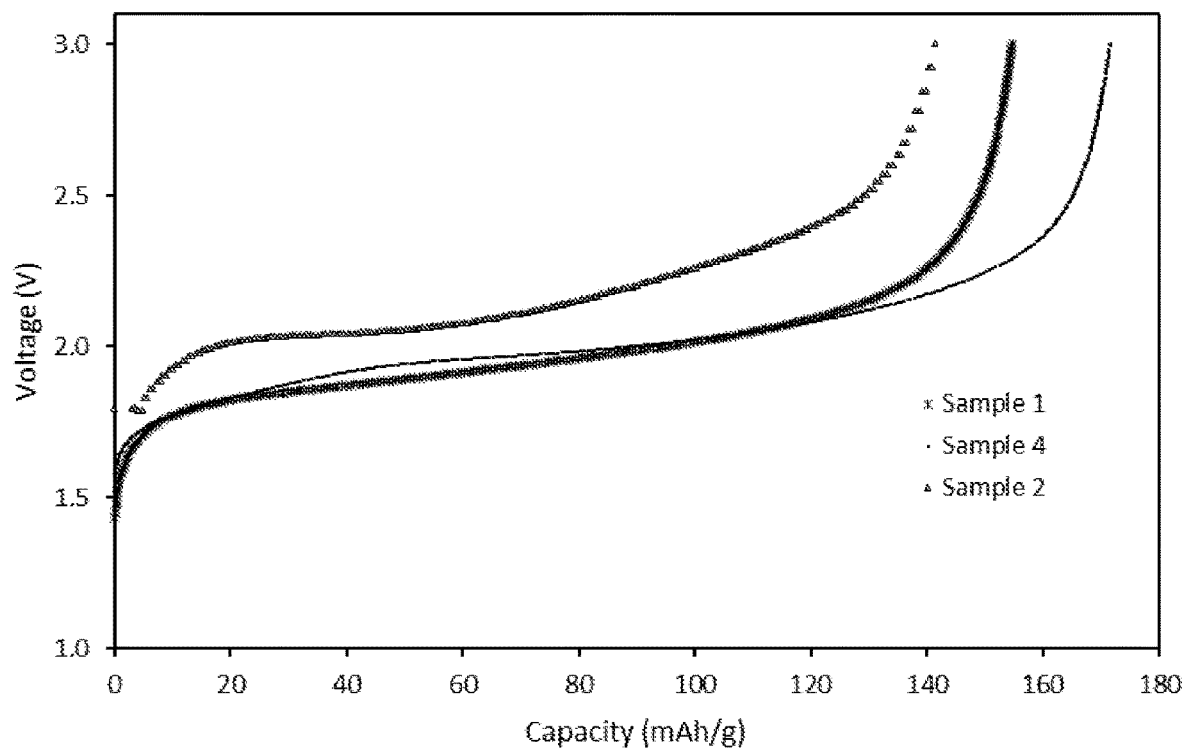
FIG. 2: Galvanostatic de-lithiation curves at a rate of 5C constant current for Samples 1*, 2*, and 4 of the Examples, demonstrating the increased capacity and lower polarisation of Sample 4

Samples 3, 4, and 5≤demonstrate the effect of providing a mixture of sample 1* and 2* in different proportions, i.e. a mixture of a niobium oxide and a modified mixed niobium oxide in accordance with the invention. Surprisingly, all mixtures demonstrated increased specific capacity at charge/discharge rates at 10C and above compared to samples 1* and 2*, demonstrating a synergistic improvement over either individual material in terms of the impedance/polarisation in the Li-ion cells tested (Table 4). Sample 3, 4, and 5 also demonstrated a lower nominal de-lithiation voltage at 5C than samples 1* and 2*, which represents improved polarisation (Table 3). FIG. 2 demonstrates the increased capacity and lower polarisation of Sample 4 compared to Samples 1* and 2* at 5C.

Samples 6 and 7 demonstrate the effect of providing a mixture of sample 8* or 9* respectively with sample 2*, i.e. a mixture of a niobium oxide and a modified mixed niobium oxide in accordance with the invention. Samples 6 and 7 demonstrated a lower nominal de-lithiation voltage at a rate of 5C than samples 8*, 9*, and 2*, which represents decreased polarisation, demonstrating improved performance for the material at high charge/discharge rates (Table 3).

Accordingly, the mixture of a niobium oxide and a modified mixed niobium oxide was found to provide an active electrode material with surprisingly improved properties for use in high-power Li-ion cells, i.e. cells designed for fast charge/discharge.

At lower charge/discharge rates of C/10 there is a linear trend for the specific capacity values for the mixtures between the individual samples 1* and 2* (Table 3). This allows the properties of the active electrode material at low rates to be tuned, for example allowing for a balance to be achieved between a desired capacity at an acceptable cost.

Reference Examples—Set A

The following Reference Examples demonstrate the improvement in the properties of unmodified 'base' $MoNb_{12}O_{33}$ and $WNb_{12}O_{33}$ which is achieved by substitution of M3 for Nb and/or O for Q, with optional further substitution of M1 for M2 and/or induced oxygen deficiency. It would be expected that the same improvements would be seen when the modified mixed niobium oxides are combined with niobium oxides in accordance with the invention.

The mixed niobium oxides were synthesised by a solid-state route. In a first step precursor materials ($Nb_2O_5$, $NH_4H_2PO_4$, $MoO_3$, $Al_2O_3$, $WO_3$, $ZrO_2$, $ZnO$) were mixed in stoichiometric proportions (50 g total) and ball-milled at 350 rpm with a ball to powder ratio of 10:1 for 1 h. The resulting powders were heat treated in an alumina crucible in a muffle furnace in air at $T_{1a}$=250-900° C. for 1-12 h followed by $T_{1b}$=700-1350° C. for 2-16 h, providing the desired Wadsley-Roth phase. An additional heat treatment step was also applied in some cases under a $N_2$ atmosphere at $T_2$=800-1350° C. for 1-12 h. For inclusion of anions, there was an additional milling/mixing step with the precursor ($C_3H_6N_6$ in a 1:3 mass ratio versus the parent material for N, PVDF in a 1:10 mass ratio for F) prior to heat treatment in a $N_2$ or air atmosphere at $T_2$=300-1200° C. for 1-24 h.

A final de-agglomeration step was utilised by impact milling or jet milling to adjust to the desired particle size distribution where necessary. Specifically, the material was de-agglomerated by impact milling at 20,000 RPM for 10 seconds.

TABLE 5

A summary of the materials synthesised. Particle size distribution has been evaluated by dry powder laser diffraction.

| Sample | Material | $T_{1a}$ (° C.; h) | $T_{1b}$ (° C.; h) | $T_2$ (° C.; h) | D10 (μm) | D50 (μm) | D90 (μm) |
|---|---|---|---|---|---|---|---|
| 1* | $MoNb_{12}O_{33}$ | — | 900; 12 | — | 1.3 | 4.8 | 11.0 |
| 2** | $Mo_{0.75}W_{0.25}Nb_{12}O_{33}$ | — | 900; 12 | — | 1.5 | 4.7 | 9.7 |

TABLE 5-continued

A summary of the materials synthesised. Particle size distribution has been evaluated by dry powder laser diffraction.

| Sample | Material | $T_{1a}$ (° C.; h) | $T_{1b}$ (° C.; h) | $T_2$ (° C.; h) | D10 (μm) | D50 (μm) | D90 (μm) |
|---|---|---|---|---|---|---|---|
| 3 | $Mo_{0.75}W_{0.25}Nb_{11.95}Zr_{0.05}O_{32.975}$ | — | 900; 12 | — | — | — | — |
| 4 | $Mo_{0.75}W_{0.25}Nb_{11.9}Zr_{0.1}O_{32.95}$ | — | 900; 12 | — | 2.4 | 5.3 | 9.9 |
| 5 | $Mo_{0.75}W_{0.25}Nb_{11.95}Al_{0.05}O_{32.95}$ | — | 900; 12 | — | 1.3 | 4.7 | 10.3 |
| 6 | $Mo_{0.75}W_{0.25}Nb_{11.95}Zn_{0.05}O_{32.925}$ | — | 900; 12 | — | — | — | — |
| 7 | $Mo_{0.75}W_{0.25}Nb_{11.95}Mo_{0.05}O_{33.025}$ | — | 900; 12 | — | — | — | — |
| 8 | $Mo_{0.75}W_{0.25}Nb_{11.95}W_{0.05}O_{33.025}$ | — | 900; 12 | — | — | — | — |
| 9 | $Mo_{0.75}W_{0.25}Nb_{11.95}P_{0.05}O_{33}$ | 380; 3 | 900; 12 | — | — | — | — |
| 10 | $Mo_{0.75}W_{0.25}Nb_{12}O_{33-y}N_y$ | — | 900; 12 | 700; 10† | 2.1 | 5.9 | 12.2 |
| 12 | $Mo_{0.75}W_{0.25}Nb_{11.9}Zr_{0.1}O_{32.95-y}F_y$ | 900; 12 | 950; 5† | 375; 24 | 0.8 | 5.5 | 16.7 |
| 13 | $Mo_{0.75}W_{0.25}Nb_{11.95}Al_{0.05}O_{32.95-y}F_y$ | 900; 12 | 950; 5† | 375; 24 | — | — | — |
| 14*** | $Mo_{0.75}W_{0.25}Nb_{11.95}Al_{0.05}O_{32.95-y}$ | 900; 12 | 950; 5† | — | 0.9 | 4.7 | 13.8 |
| 15*** | $Mo_{0.75}W_{0.25}Nb_{11.95}Mo_{0.05}O_{33.025-y}$ | 900; 12 | 950; 5† | — | 0.8 | 3.6 | 9.8 |
| 16*** | $Mo_{0.75}W_{0.25}Nb_{11.9}Zr_{0.1}O_{32.95-y-z}N_z$ | 900; 12 | 700; 10† | 950; 5† | — | — | — |
| 17*** | $Mo_{0.75}W_{0.25}Nb_{12}O_{33-y-z}N_z$ | 900; 12 | 700; 10† | 950; 5† | — | — | — |

*Comparative sample - unmodified 'base' $MoNb_{12}O_{33}$
**Comparative sample - $MoNb_{12}O_{33}$ with cation exchange at M2 site
***Induced oxygen deficiency may be calculated from e.g. TGA
†This heat treatment step was carried out in a $N_2$ atmosphere. All others were carried out in an air atmosphere.

Materials Characterisation

The phase purity of samples was analysed using a Rigaku Miniflex powder X-ray diffractometer in 2θ range (10-70°) at 1°/min scan rate.

Figure 3:
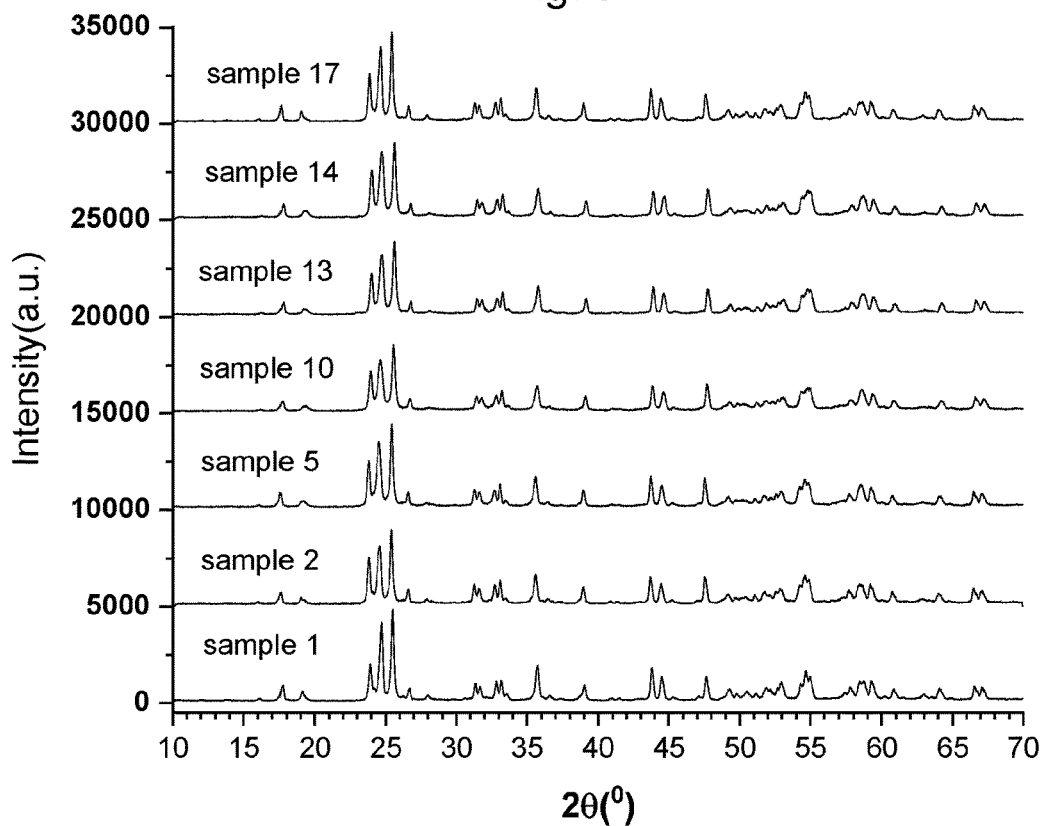
FIG. 3: Powder XRD of Samples 1, 2, 5, 10, 13, 14, and 17 of Reference Examples—Set A.

FIG. 3 shows the measured XRD diffraction patterns for Samples 1, 2, 5, 10, 13, 14, 17. Diffraction patterns have peaks at the same locations (with some shift due to crystal modification, up to around 0.2°), and match ICDD crystallography database entry JCPDS, which corresponds to JCPDS 73-1322. There is no amorphous background noise and the peaks are sharp and intense. This means that all samples are crystalline, with crystallite size 35-42 nm according to the Scherrer equation and crystal structure matching $MoNb_{12}O_{33}$ or the isostructural $WNb_{12}O_{33}$. This confirms the presence of a Wadsley-Roth crystal structure.

TABLE 6

A summary table of unit cell parameters for each sample calculated by Rietveld refinement of their powder XRD spectra with software GSASII, and average crystallite size calculated by the Scherrer equation across the spectra.

| Sample | a [Å] | b [Å] | c [Å] | β [°] | Vol(Å³) | $\chi^2$ | Crystallite size [nm] |
|---|---|---|---|---|---|---|---|
| Reference | 22.370 | 3.825 | 17.870 | 123.60 | 1273.58 | — | — |
| 1* | 22.285 | 3.826 | 17.744 | 123.3 | 1264.81 | 9 | 37.9 |
| 2** | 22.327 | 3.833 | 17.794 | 123.28 | 1273.27 | 10 | 38.3 |
| 4 | 22.314 | 3.833 | 17.781 | 123.28 | 1271.72 | 8 | 41.4 |
| 5 | 22.312 | 3.836 | 17.786 | 123.29 | 1271.26 | 9 | 40.2 |
| 10 | 22.322 | 3.834 | 17.806 | 123.22 | 1275.07 | 10 | 35.5 |
| 13 | 22.315 | 3.829 | 17.799 | 123.31 | 1271.20 | 9 | 36.2 |
| 14 | 22.316 | 3.832 | 17.797 | 123.23 | 1273.16 | 10 | 36.0 |

$\chi^2$ represents the goodness of fit and is a representation of how accurate the Rietveld refinement is, a value ≤10 supports the accuracy of the data.

Particle Size Distributions were obtained with a Horiba laser diffraction particle analyser for dry powder. Air pressure was kept at 0.3 MPa. The results are set out in Table 5.

Confocal Raman spectroscopy was carried out on selected samples. A laser excitation of 532 nm, attenuation of 10% and magnification of 50 was used on a Horiba Xplora Plus Raman microscope, with samples pressed into pellets at 10 MPa pressure, and placed on a glass slide. Spectra were recorded with on average an acquisition time of 15 s per scan, 3 repeats and 3 different sample locations in the spectral range of 0-2500 $cm^{-1}$. Peaks characteristic to structures containing $Nb_xO_y$ species can be found in the region 500-700 $cm^{-1}$, those relating to longer Nb—O bonds in corner-shared octahedral units at 760-770 $cm^{-1}$, distorted octahedral species relating to O=Nb—O at 890-900 $cm^{-1}$, and shorter Nb—O bonds as in edge shared octahedra at 1000 $cm^{-1}$. Notably, Sample 2** contains a peak at ~650 $cm^{-1}$ which is absent in Samples 13, 15, 16, and 17. This is believed to provide proof of change to Nb—O bonds in the material which is evidence of the modification to the crystal structure caused by the induced oxygen vacancies and/or substitution of O by N or F.

Electrochemical Characterisation

Li-ion cell charge rate is usually expressed as a "C-rate". A 1C charge rate means a charge current such that the cell is fully charged in 1 h, 10C charge means that the battery is fully charged in 1/10th of an hour (6 minutes). C-rate hereon is defined from the reversible capacity observed of the anode within the voltage limits applied in its second cycle de-lithiation, i.e. for an anode that exhibits 1.0 mAh $cm^{-2}$ capacity within the voltage limits of 1.1-3.0 V, a 1C rate corresponds to a current density applied of 1.0 mA $cm^{-2}$. In a typical MNO material as described herein, this corresponds to ~200 mA/g of active material.

Electrochemical tests were carried out in half-coin cells (CR2032 size) for analysis. In half-coin tests, the active material is tested in an electrode versus a Li metal electrode to assess its fundamental performance. In the below examples, the active material composition to be tested was combined with N-Methyl Pyrrolidone (NMP), carbon black (Super P) acting as a conductive additive, and poly(vinylidifluoride) (PVDF) binder and mixed to form a slurry using a lab-scale centrifugal planetary mixer. The non-NMP composition of the slurries was 92 wt % active material, 3 wt % conductive additive, 5 wt % binder. The slurry was coated on an Al foil current collector to the desired loading of 69-75 g $m^{-2}$ by doctor blade coating and dried by heating. The electrodes were then calendared to a density of 2.6-3.2 g $cm^{-3}$ at 80° C. to achieve targeted porosities of 35-40%. Electrodes were punched out at the desired size and combined with a separator (Celgard porous PP/PE), Li metal, and electrolyte (1.3 M $LiPF_6$ in EC/DEC) inside a steel coin cell casing and sealed under pressure. Cycling was then carried out at 23° C. at low current rates (C/10) for 2 full cycles of lithiation and de-lithiation between 1.1-3.0 V. Afterwards, the cells were tested for their performance at increasing current densities. During these tests, the cells were cycled asymmetric at 23° C., with a slow lithiation (C/5) followed by increasing de-lithiation rates (e.g. 5C) to provide the nominal voltage at 5C. Nominal voltage vs Li/Li+ has been calculated from the integral of the V/Q curve divided by the total capacity at 5C during de-lithiation. No constant voltage steps were used. Data has been averaged from 5 cells prepared from the same electrode coating, with the error shown from the standard deviation. Accordingly, the data represent a robust study showing the improvements achieved by the modified mixed niobium oxides compared to prior materials.

The electrical resistivity of the electrode coating was separately assessed by a 4-point-probe method with an Ossila instrument. An electrode coating was prepared to a mass loading of 69-75 g cm$^{-2}$ and calendared to a porosity of 35-40% on a sheet of insulating mylar for all samples. The sheet resistance was then measured on a 14 mm diameter disc in units of Q per square at constant temperature of 23° C.

Homogeneous, smooth coatings on both Cu and Al current collector foils, the coatings being free of visible defects or aggregates may also be prepared as above for these samples with a centrifugal planetary mixer to a composition of up to 94 wt % active material, 4 wt % conductive additive, 2 wt % binder. These can be prepared with both PVDF (i.e. NMP-based) and CMC:SBR-based (i.e. water-based) binder systems. The coatings can be calendared at 80° C. for PVDF and 50° C. for CMC:SBR to porosities of 35-40% at loadings from 1.0 to 5.0 mAh cm$^{-2}$. This is important to demonstrate the viability of these materials in both high energy and high-power applications, with high active material content.

TABLE 7

A summary of electrical resistance measurements carried out as described. Resistivity was measured by 4-point-probe techniques, on equivalent coatings on mylar.

| Sample | Sheet resistance [kΩ per square] |
|---|---|
| 1* | 2.96 ± 0.31 |
| 2** | 1.26 ± 0.04 |
| 5 | 1.43 ± 0.09 |
| 10 | 1.29 ± 0.11 |
| 12 | 1.20 ± 0.14 |
| 14 | 1.41 ± 0.04 |

TABLE 8

A summary of electrochemical testing results from Li-ion half coin cells. In general it is beneficial to have a higher capacity, a higher Coulombic efficiency, and a lower nominal voltage.

| Sample | Delithiation specific capacity $2^{nd}$ C/10 cycle [mAh/g] | Coulombic efficiency $1^{st}$ cycle at C/10 [%] | Coulombic efficiency $2^{nd}$ cycle at C/10 [%] | Nominal de-lithiation voltage at 5 C vs Li/Li$^+$ [V] |
|---|---|---|---|---|
| 1* | 200.5 ± 2.8 | 87.7 ± 0.7 | 98.8 ± 0.1 | 1.910 |
| 2** | 199.4 ± 3.2 | 88.8 ± 0.2 | 99.4 ± 0.1 | 1.878 |
| 5 | 201.2 ± 2.6 | 88.4 ± 0.1 | 99.7 ± 0.0 | 1.901 |
| 10 | 203.6 ± 7.0 | 88.3 ± 0.6 | 98.8 ± 0.2 | 1.938 |
| 12 | 205.1 ± 7.5 | 90.4 ± 0.2 | 99.3 ± 0.2 | 1.894 |
| 14 | 206.9 ± 10.1 | 90.6 ± 1.0 | 99.3 ± 0.2 | 1.901 |

Example A—Cation Exchange

The mixed niobium oxide has been modified through a cation substitution approach in samples 3-9, focused at the Nb$^{5+}$ cations within the 3×4 block of NbO$_6$ octahedra. In the case of samples 3-6, the exchange has been carried out with a cation of reduced valency. Samples 7-8 show increased valency, and sample 9 shows isovalent exchange. This is expected to provide an advantage versus the base crystal structure of sample 1 through the combination of (a) altered ionic radii, (b) altered valency, and (c) altered voltage. Altered ionic radii can give rise to beneficial changes in electrochemical performance due to changing unit cell size and local distortions in crystal structure altering available lithiation sites or lithiation pathways—potentially improving Coulombic efficiency, capacity, performance at high rate, and lifetime. For example, the ionic radius of the 6-coordinate Nb$^{5+}$ cation is 0.64 Å vs the ionic radius of 6-coordinate Al$^{3+}$ cation of 0.54 Å in sample 5. Cation exchange provides significantly improved electrical conductivity of the material compared to the unmodified sample 1*, believed to be due to providing available intermediate energy levels for charge carriers, as shown in Table 7. This is believed to further result in better performance at high charge and discharge rates, and reduced nominal voltage at high rates due to lower polarisation in the cell. If the substitution takes place in the same cation site, then the O-content of the material will be decreased proportionally to maintain a charge-balanced structure (i.e. oxygen deficient vs the base MoNb$_{12}$O$_{33}$ structure). Voltage can further be modified through the introduction of cations with different electrochemical redox potentials, allowing the design of materials to provide lower nominal voltage.

Table 6 demonstrates the alterations in unit cell parameters observed upon cation exchange, observed due to alterations of ionic radii and electronic structure of these materials.

It is expected that similar benefits will be observed with the described cation exchange approach for this material for use in Li-ion cells.

Example B—Anion Exchange

The mixed niobium oxide has been modified through the introduction of N$^{3-}$ anions (cf. nitridation) to provide Sample 10. This was carried out by a solid-state synthesis route but could equally be carried out with a gaseous route utilising NH$_3$ gas at high temperature, or through use of a dissolved N-containing material in a solvent that is subsequently evaporated followed by high temperature heat treatment. Sample 10 is grey/blue compared to Sample 2**, which is off-white, demonstrating changes to the active material electronic structure in a similar fashion to Example A.

In a similar fashion to Example A with cation exchange, this exchange may take place in an $O^{2-}$ anion site, in which case the increased valency may increase the electronic conductivity of the material. It may also take place in an interstitial site within the crystal structure. In both cases, this may also give rise to different unit cell size and associated crystallographic distortions due to the differing ionic radii and valency of the anions, providing similar potential benefits to Example A.

In a similar fashion, the mixed niobium oxide can be altered through the introduction of $F^-$ anions to provide samples 12 and 13, providing an advantage in the Coulombic efficiency versus the reference samples 1 and 2.

Table 6 demonstrates the change in unit cell parameters that take place upon introduction of $N^{3-}$ anions or $F^-$ anions, providing further evidence for anion incorporation within the crystal structure.

Figure 4:
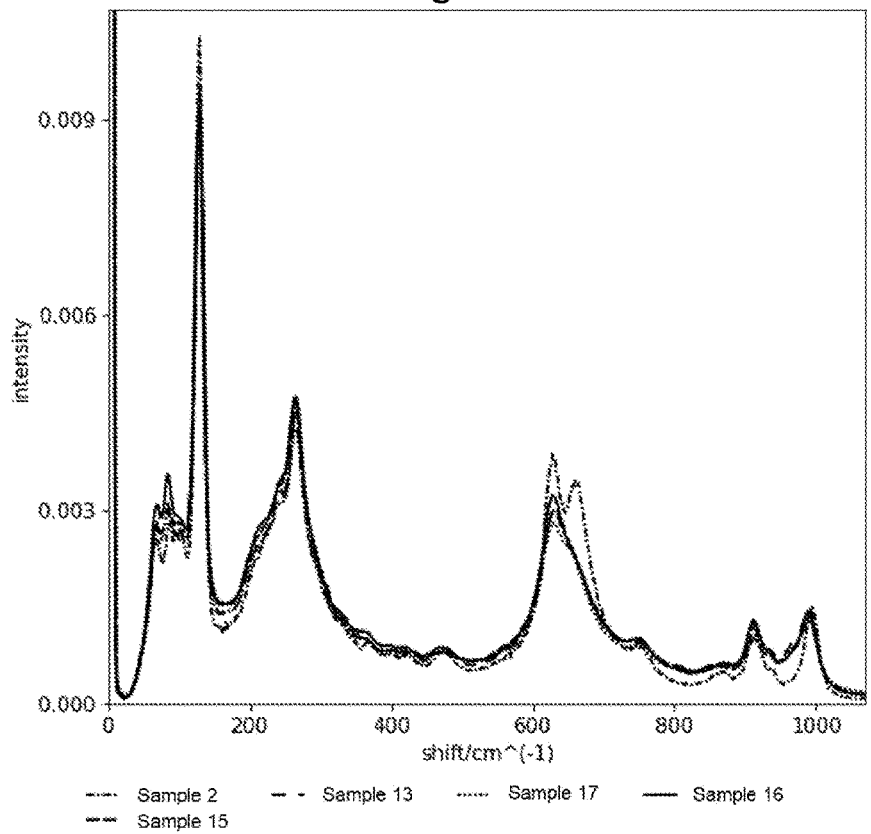
FIG. 4: Confocal Raman spectroscopy carried out Samples 2, 13, 15, 16, and 17 of Reference Examples—Set A. A laser excitation of 532 nm, attenuation of 10% and magnification of 50 was used on a Horiba Xplora Plus Raman microscope, with samples pressed into pellets at 10 MPa pressure, and placed on a glass slide. Spectra were recorded with on average an acquisition time of 15 s per scan, 3 repeats and 3 different sample locations in the spectral range of 0-2500 cm$^{-1}$.

FIG. 4 further shows evidence of N or F incorporation by the change in the characteristic peaks corresponding to Nb—O bonds at 500-700 $cm^{-1}$ in the Raman spectra.

It is expected that similar benefits will be observed through the use of anions of different electronegativity and valency with any of the described MNO structures for use in Li ion cells.

Example C—Induced Oxygen Vacancy Defects

Sample 5, 7, and 10 have been modified through the introduction of induced oxygen vacancy defects (cf. oxygen deficiency) by a heat treatment in an inert or reducing atmosphere to provide Samples 14, 15, and 17. By treating these materials at high temperature in an inert or reducing atmosphere, they may be partially reduced and maintain this upon return to room temperature and exposure to an air atmosphere. This is accompanied with an obvious colour change, for example Sample 15 is purple/blue in colour vs white for Sample 7. This colour change demonstrates a significant change in the electronic structure of the material, allowing it to interact with different energies (i.e. wavelength) of visible light due to the reduced band gap. This is reflected in sample 14, demonstrating a reduced nominal voltage at a rate of 5C, which corresponds to a reduced level of polarisation in the cell.

The induced oxygen vacancy is specifically a defect in the crystal structure where an oxygen anion has been removed, and the overall redox state of the cations is reduced in turn. This provides additional energetic states improving material electrical conductivity significantly, and alters the band gap energy as demonstrated by colour changes. If induced oxygen vacancies are present beyond 5≤atomic % (i.e. c>1.65), then the crystal structure may be less stable. These induced oxygen vacancies can be present in addition to oxygen deficiency caused by the use of subvalent cation exchange, as shown in Sample 14.

Evidence of oxygen deficiency is provided here by Raman spectra in FIG. 4, as in Example B. A host of other techniques can also be employed as described above to quantify oxygen deficiency.

It is expected that similar benefits will be observed with the described approach to induce oxygen vacancy defects for this material for use in Li-ion cells.

DISCUSSION

Comparative Sample 1* or 2** may also be modified with more than one type of cation/anion substitution, or induced oxygen deficiency (i.e. a>0 and b>0; or a>0, d>0; or a>0, b>0, c>0, and so on). Samples 3-9 demonstrates the effect of having a>0 and b>0; Sample 16 demonstrates the effect of having a>0, b>0, c>0 and d≥0. Improvements as described for Examples A-C are expected for these materials that demonstrate multiple types of modifications.

Table 6 demonstrates changes in unit cell parameters for modified materials reflecting the alterations to the materials that have taken place at the crystal level. All samples show large improvements in the electrical resistance vs Sample 1* as shown in Table 7. Electrochemical measurements additionally show significant advantages for modified samples vs Sample 1* in $1^{st}$ and $2^{nd}$ cycle Coulombic efficiencies, and in their nominal voltage at a 5C de-lithiation rate as in Table 8. Moreover, modifying Sample 2** by including substation at the Nb site and/or at the O site provided improved specific capacity, and important result demonstrating the utility of the modified materials for use as active electrode materials.

Modifying the 'base' material by introducing increased degrees of disorder in the crystal structure (cf. entropy) can aid in reversible lithiation processes by providing less significant energy barriers to reversible lithiation, and preventing Li ion ordering within a partially lithiated crystal. This can also be defined as creating a spread in the energetic states for Li ion intercalation, which prevents unfavourable lithium ordering and entropic energy barriers. This can be inferred from examining dQ/dV or Cyclic Voltammetry plots.

It is expected that similar benefits will be observed in any of the described MNO structures utilising any combination of M1, M2, M3, Q, a, b, c, and d within the described limits for use in Li ion cells.

Reference Examples—Set B

The following Reference Examples demonstrate the improvement in the properties of unmodified 'base' $MoNb_{12}O_{33}$ and $WNb_{12}O_{33}$ which is achieved by substitution of M2 for M1 and/or by inducing oxygen deficiency. It would be expected that the same improvements would be seen when the modified mixed niobium oxides are combined with niobium oxides in accordance with the invention.

A number of different materials were prepared and characterised, as summarised in Table 9, below. Broadly, these samples can be split into a number of groups. Samples R1, R2, R3, R4, R5, R8, R9, R10, R11, and R12 belong to the same family of Wadsley-Roth phases based on $MoNb_{12}O_{33}$ ($M^{6+}Nb_{12}O_{33}$, 3×4 block of octahedra with a tetrahedron at each block corner). The blocks link to each other by edge sharing between $NbO_6$ octahedra, as well as corner sharing between $M^{6+}O_4$ tetrahedra and $NbO_6$ octahedra. Sample R1 is the base crystal structure, which is modified to a mixed metal cation structure by exchanging one or multiple cations in samples R2 to R4, and/or in a mixed crystal configuration (blending with isostructural $WNb_{12}O_{33}$) in samples R8, R9, R10, R11, and R12. Oxygen deficiencies are created in the base crystal in sample R5 and in the mixed metal cation structure R11. Sample R3 is a spray-dried and carbon-coated version of the crystal made in sample R2, and sample R12 is a spray-dried and carbon-coated version of the crystal made in sample R10. Samples R6, R7 and R13 belong to the same family of Wadsley-Roth phases based on $WNb_{12}O_{33}$ ($M^{6+}$ $Nb_{12}O_{33}$, a 3×4 $NbO_6$ octahedra block with a tetrahedron at each block corner).

TABLE 9

A summary of different compositions synthesised.
Samples indicated with * are comparative samples.

| Sample No. | Composition | Material Synthesis |
|---|---|---|
| R1* | $MoNb_{12}O_{33}$ | Solid state |
| R2 | $Ti_{0.05}Mo_{0.95}Nb_{12}O_{32.95}$ | Solid state |
| R3 | $Ti_{0.05}Mo_{0.95}Nb_{12}O_{32.95}$ + C | Solid state, spray dry, carbon pyrolysis |
| R4 | $Zr_{0.05}Mo_{0.95}Nb_{12}O_{32.95}$ | Solid state |
| R5 | $MoNb_{12}O_{<33}$ | Solid state |
| R6* | $WNb_{12}O_{33}$ | Solid state |
| R7 | $Ti_{0.05}W_{0.95}Nb_{12}O_{32.95}$ | Solid state |
| R8 | $W_{0.25}Mo_{0.75}Nb_{12}O_{33}$ | Solid state |
| R9 | $Ti_{0.05}W_{0.25}Mo_{0.70}Nb_{12}O_{32.95}$ | Solid state |
| R10 | $Ti_{0.05}Zr_{0.05}W_{0.25}Mo_{0.65}Nb_{12}O_{32.9}$ | Solid state |
| R11 | $Ti_{0.05}Zr_{0.05}W_{0.25}Mo_{0.65}Nb_{12}O_{<32.9}$ | Solid state |
| R12 | $Ti_{0.05}Zr_{0.05}W_{0.25}Mo_{0.65}Nb_{12}O_{32.9}$ + C | Solid state, spray dry, carbon pyrolysis |
| R13 | $WNb_{12}O_{33-\alpha}$ | Solid state |

Material Synthesis

Samples listed in Table 9 were synthesised using a solid-state route. In a first step, metal oxide precursor commercial powders ($Nb_2O_5$, $NbO_2$, $MoO_3$, $ZrO_2$, $TiO_2$, $WO_3$, $V_2O_5$, $ZrO_2$, $K_2O$, $CoO$, $ZnO$ and/or $MgO$) were mixed in stochiometric proportions and planetary ball-milled at 550 rpm for 3 h in a zirconia jar and milling media with a ball to powder ratio of 10:1. The resulting powders were then heated in a static muffle furnace in air in order to form the desired crystal phase. Samples R1 to R5 and R8 to R12 were heat-treated at 900° C. for 12 h; samples R6 to R7 were heat-treated at 1200° C. for 12 h. Sample R3 and R12 were further mixed with a carbohydrate precursor (such as sucrose, maltodextrin or other water-soluble carbohydrates), dispersed in an aqueous slurry at concentrations of 5, 10, 15, or 20 w/w % with ionic surfactant, and spray-dried in a lab-scale spray-drier (inlet temperature 220° C., outlet temperature 95° C., 500 mL/h sample introduction rate). The resulting powder was pyrolyzed at 600° C. for 5 h in nitrogen. Sample R5 and R11 were further annealed in nitrogen at 900° C. for 4 hours.

Sample R13 was prepared by ball milling as above, and impact milling at 20,000 rpm as needed to a particle size distribution with D90<20 μm, heat-treated as in a muffle furnace in air at 1200° C. for 12 h and then further annealed in nitrogen at 1000° C. for 4 h.

XRD Characterisation of Samples

The phase purity of some samples was analysed using Rigaku Miniflex powder X-ray diffractometer in 2θ range (10-70°) at 1°/min scan rate.

Figure 5:
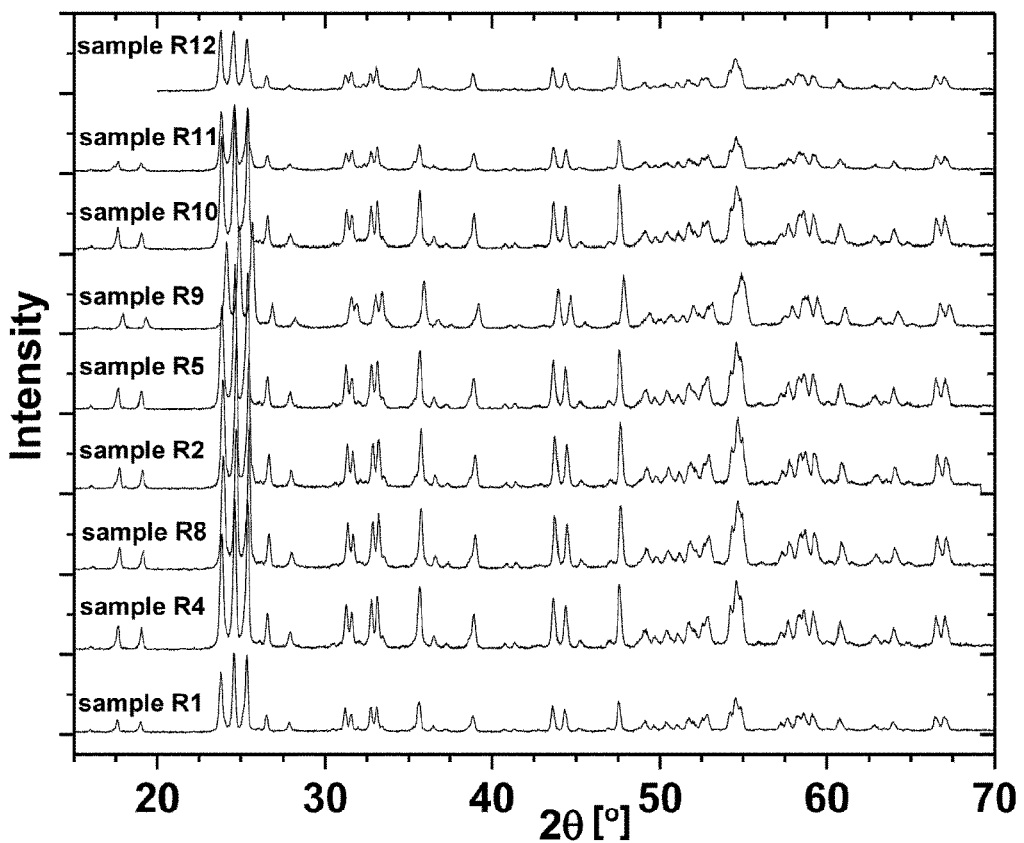
FIG. 5 shows XRD diffraction patterns of samples R1, R4, R8, R2, R5, R9, R10, R11 and R12 of Reference Examples—Set B.

FIG. 5 shows the measured XRD diffraction patterns for samples R1, R4, R8, R2, R5, R9, R10, R11, R12 which are relevant to Comparative Study A. All diffraction patterns have peaks at the same locations (within instrument error, that is 0.1°), and match JCPDS crystallography database entry JCPDS 73-1322. There is no amorphous background noise and the peaks are sharp and intense. This means that all samples are phase-pure and crystalline, with crystallite size ~200 nm according to the Scherrer equation and crystal structure matching $MoNb_{12}O_{33}$.

Figure 6:
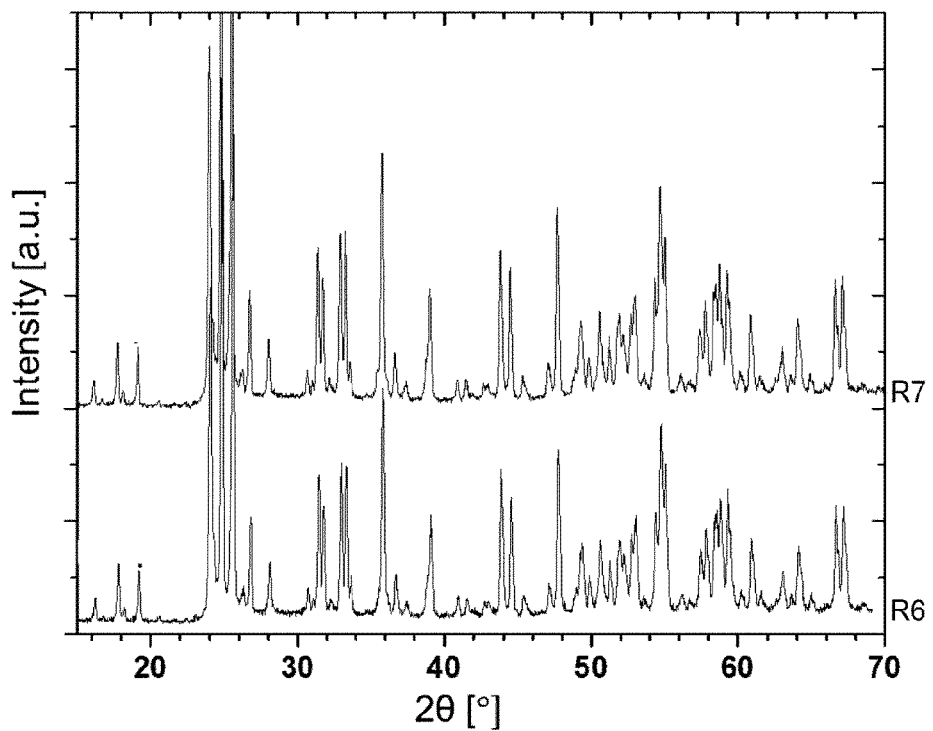
FIG. 6 shows XRD diffraction patterns of samples R6 and R7 of Reference Examples—Set B.

FIG. 6 shows the measured XRD diffraction patterns for samples R6 and R7. All diffraction patterns have peaks at the same locations (within instrument error, that is 0.1°), and match JCPDS crystallography database entry JCPDS 73-1322. There is no amorphous background noise and the peaks are sharp and intense. This means that all samples are phase-pure and crystalline, with crystallite size ~200 nm according to the Scherrer equation and crystal structure matching $WNb_{12}O_{33}$.

Qualitative Assessment of Oxygen Deficiency

As discussed above, sample R5 and R11 were heat-treated at 900° C. for 12 h to form the active electrode material, and was then further annealed in nitrogen (a reducing atmosphere) at 900° C., in a post-processing heat treatment step. A colour change from white to dark purple was observed after the post-processing heat treatment in nitrogen, indicating change in oxidation states and band structure of the material, as a result of oxygen deficiency of the sample.

Sample R13 was further annealed in nitrogen at 1000° C. for 4 h. Sample R6 transitions from off-white to light blue in R13.

Electrochemical Testing of Samples

Electrochemical tests were carried out in half-coin cells (CR2032 size) for initial analysis. In half-coin tests, the material is tested in an electrode versus a Li metal electrode to assess its fundamental performance. In the below examples, the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer (although it is also possible to form aqueous slurries by using water rather than NMP). The non-NMP composition of the slurries was 80 w. % active material, 10 w. % conductive additive, 10 w. % binder. The slurry was then coated on an Al foil current collector to the desired loading of 1 mg/cm² by doctor blade coating and dried in a vacuum oven for 12 hours. Electrodes were punched out at the desired size and combined with a separator (Celgard porous PP/PE), Li metal, and electrolyte (1 M $LiPF_6$ in EC/DEC) inside a steel coin cell casing and sealed under pressure. Formation cycling was then carried out at low current rates (C/20) for 2 full charge and discharge cycles. After formation, further cycling can be carried out at a fixed or varied current density as required. These tests have been termed "half-cell galvanostatic cycling" for future reference. Homogeneous, smooth coatings on current collector foil, the coatings being free of visible defects were also prepared as above with a centrifugal planetary mixer to a composition of 94 w. % active material, 4 w. % conductive additive, 2 w. % binder. The coatings were calendared at 80° C. to a density of up to 3.0 g/cm³ at loadings of 1.3-1.7 mAh/cm² in order to demonstrate possible volumetric capacities >700 mAh/cm³ in the voltage range 0.7-3.0 V at C/20, and >640 mAh/cm³ in the voltage range 1.1-3.0 V at C/5. This is an important demonstration of these materials being viable in a commercially focused electrode power cell formulation, where retaining performance after calendaring to a high electrode density allows for high volumetric capacities. Loadings of up to and including 1.0, 1.5, 2.0, 2.5, or 3.0 mAh/cm² may be useful for Li-ion cells focused on power performance; loadings greater than 3.0, 4.0, or 5.0 mAh/cm² are useful for energy-focused performance in Li ion cells. Calendaring of these materials was demonstrated down to electrode porosity values of 35%, and typically in the range 35-40%; defined as measured electrode density divided by the average of the true densities of each electrode component adjusted to their w/w %. Some of the data obtained for the Reference Examples Set B may not have been obtained under identical conditions to the data obtained for the Reference Examples Set A. Therefore, the absolute values obtained for the Reference Examples Set A and the Reference Examples Set B may not be directly comparable.

Electrical conductivity of electrodes made with the samples listed in Table 9 was measured using a 4-point probe thin film resistance measurement apparatus. Slurries were formulated according to the procedure described above and coated on a dielectric mylar film at a loading of 1 mg/cm². Electrode-sized discs where then punched out and resistance of the coated-film was measured using a 4-point probe. Bulk resistivity can be calculated from measured resistance using the following equation:

$$\text{Bulk resistivity } (\rho) = 2\pi s (V/I); R = V/I; s = 0.1 \text{ cm} \quad (3)$$
$$= 2\pi \times 0.1 \times R(\Omega)$$

The results of this test are shown in Table 10, below:

TABLE 10

Summary of 4-point probe resistivity measurement results for samples R1, R2, R4, R5 and R8 to R12.

| Sample | Resistance [kΩ] | Bulk resistivity [kΩ · cm] |
|---|---|---|
| R1* | 8.5 | 5.3 |
| R2 | 1.7 | 1.1 |
| R4 | 3.2 | 2.0 |
| R5 | 0.52 | 0.33 |
| R8 | 2.7 | 1.7 |
| R9 | 1.2 | 0.75 |
| R10 | 1.3 | 0.82 |

TABLE 10-continued

Summary of 4-point probe resistivity measurement results for samples R1, R2, R4, R5 and R8 to R12.

| Sample | Resistance [kΩ] | Bulk resistivity [kΩ · cm] |
|---|---|---|
| R11 | 0.89 | 0.56 |
| R12 | 0.33 | 0.21 |

The results of this test are shown in Table 11, below:

TABLE 11

Summary of DCIR/ASI measurement results for samples R1, R2, R4, R8, R10-R12.

| Sample | ASI/Ω · cm² |
|---|---|
| R1* | 141 |
| R2 | 125 |
| R4 | 120 |
| R8 | 99 |
| R10 | 74 |
| R11 | 75 |
| R12 | 121 |

The reversible specific capacity C/20, initial coulombic efficiency, nominal lithiation voltage vs Li/Li⁺ at C/20, 5C/0.50 capacity retention, and 10C/0.50 capacity retention for a number of samples were also tested, the results being set out in Table 12, below. Nominal lithiation voltage vs Li/Li+ has been calculated from the integral of the V/Q curve divided by the total capacity on the $2^{nd}$ cycle C/20 lithiation. Capacity retention at 10 C and 5 C has been calculated by taking the specific capacity at 100 or 50, and dividing it by the specific capacity at 0.50. It should be noted that the capacity retention was tested with symmetric cycling tests, with equivalent C-rate on lithiation and de-lithiation. Upon testing with an asymmetric cycling program, 10C/0.5C capacity retention greater than 89% is routinely observed.

TABLE 12

Summary of electrochemical testing results from Li-ion half coin cells using a number of samples. In general (although not exclusively) it is beneficial to have a higher capacity, a higher ICE, a lower nominal voltage, and higher capacity retentions.

| Sample | Reversible specific capacity C/20 [mAh/g] | Initial coulombic efficiency [%] | Nominal lithiation voltage vs Li/Li⁺ [V] | 5 C/0.5 C capacity retention [%] | 10 C/0.5 C capacity retention [%] |
|---|---|---|---|---|---|
| R1* | 214 | 87.8 | 1.61 | 62 | 35 |
| R2 | 240 | 90.9 | 1.61 | 64 | 45 |
| R3 | 203 | 84.9 | 1.58 | 79 | 68 |
| R4 | 286 | 90.7 | 1.59 | 68 | 54 |
| R5 | 253 | 86.0 | 1.60 | 63 | 43 |
| R6* | 192 | 82.0 | 1.60 | 54 | 36 |
| R7 | 188 | 86.8 | 1.61 | 64 | 54 |
| R8 | 278 | 91.0 | 1.59 | | |
| R9 | 228 | 89.2 | 1.59 | | |
| R10 | 281 | 90.8 | 1.58 | 72 | 58 |
| R11 | 228 | 90.1 | 1.59 | 84 | 68 |
| R12 | 267 | 86.9 | 1.57 | 71 | 62 |

The modification of MoNb$_{12}$O$_{33}$ and WNb$_{12}$O$_{33}$ as shown above demonstrates the applicability of cation substitution improve active material performance in Li-ion cells. By substituting the non-Nb cation to form a mixed cation structure as described, the entropy (cf disorder) can increase in the crystal structure, reducing potential energy barriers to Li ion diffusion through minor defect introduction (e.g. R10). Modification by creating mixed cation structures that retain the same overall oxidation state demonstrate the potential improvements by altering ionic radii, for example replacement of an Mo$^{6+}$ cation with W$^{6+}$ in sample R8, which can cause minor changes in crystal parameters and Li-ion cavities (e.g. tuning the reversibility of Type VI cavities in Wadsley-Roth structures) that can improve specific capacity, Li-ion diffusion, and increase Coulombic efficiencies of cycling by reducing Li ion trapping. Modification by creating mixed cation structures that result in increased oxidation state is expected to demonstrate similar potential advantages with altered ionic radii relating to capacity and efficiency, compounded by introduction of additional electron holes in the structure to aid in electrical conductivity. Modification by creating mixed cation structures that result in decreased oxidation state (e.g. Ti$^{4+}$ to replace Mo$^{6+}$ in sample R2) demonstrate similar potential advantages with altered ionic radii relating to capacity and efficiency, compounded by introduction of oxygen vacancies and additional electrons in the structure to aid in electrical conductivity. Modification by inducing oxygen deficiency from high temperature treatment in inert or reducing conditions demonstrate the loss of a small proportion of oxygen from the structure, providing a reduced structure of much improved electrical conductivity (e.g. sample R5) and improved electrochemical properties such as capacity retention at high C-rates (e.g. sample R5). Combination of mixed cation structures and induced oxygen deficiency allows multiple beneficial effects (e.g. increased specific capacity, reduced electrical resistance) to be compounded (e.g. sample R11).

Figure 7:
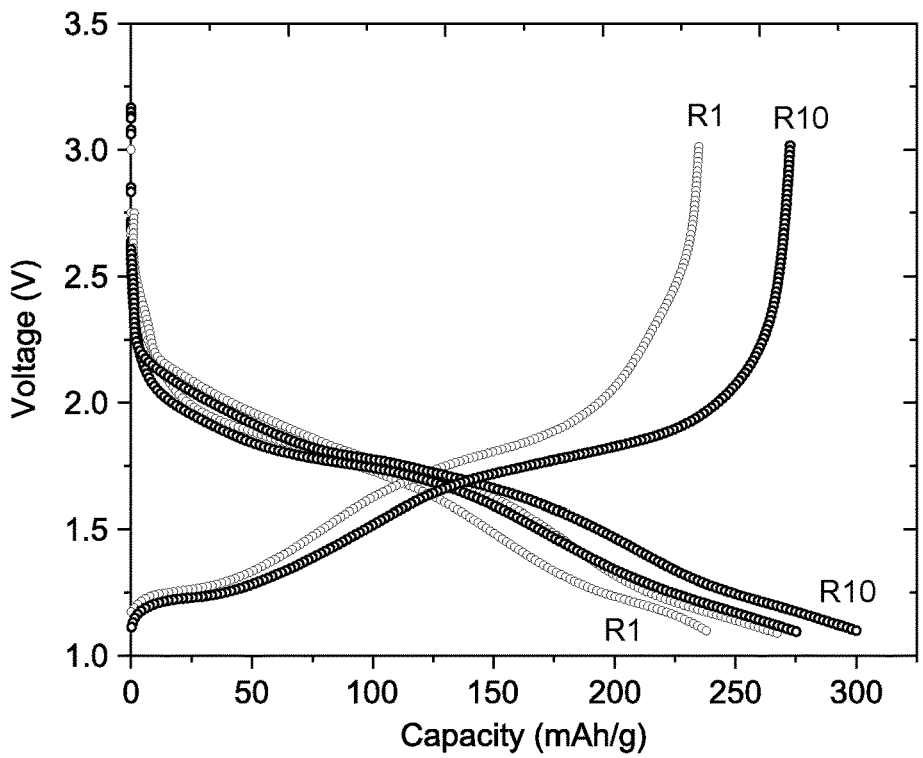
FIG. 7 shows representative lithiation and delithiation voltage profiles obtained by galvanostatic cycling in half cell configuration, 1.1-3.0 V voltage window, first 2 cycles at 0.05C rate for samples R1 and R10 of Reference Examples—Set B.

FIG. 7 shows representative lithiation/delithiation curves for unmodified and modified MoNb$_{12}$O$_{33}$ (samples R1 and R10), in their first two formation cycles at C/20 rate. In FIG. 7, approximately 90% of the specific capacity for sample R10 demonstrated is shown to be in a narrow voltage range of ca. 1.2-2.0 V; these data highlight the attractive voltage profiles achievable with MNO crystals based upon Wadsley-Roth crystal structures. Secondly, the complex metal oxide sample R10 demonstrates improved specific capacity as compared to its unmodified crystals sample R1. This is due to the cations that are included in the complex structures increasing the number of sites in the crystal that Li ions can accommodate due to their differing ionic radii and oxidation states, thus increasing capacity. An increase in ICE was observed between samples R1 and R10 which further demonstrates that Li ions intercalated in the modified crystal structure can be more efficiently delithiated as the Li ion sites are modified to enable their de-intercalation.

Across all materials tested, each modified material demonstrates an improvement versus the unmodified 'base' crystal structure. This is inferred from measurements of resistivity/impedance by two different methods, and also electrochemical tests carried out in Li-ion half coin cells, particularly the capacity retention at increased current densities (cf. rates, Table 12, FIG. 8). Without wishing to be bound by theory, the inventors suggest that this is a result of increased ionic and electronic conductivity of the materials as defects are introduced, or by alterations to the crystal lattice by varying ionic radii; also evidenced by DCIR/ASI (Table 11) measurements to show decreased resistance or impedance upon material modification. Li-ion diffusion rates likely also increase in modified materials as compared with the unmodified 'base' materials. Specific capacities themselves may also increase in some cases as shown in Table 12, as doping/exchange with metal ions of different sizes can expand or contract the crystal lattice and allow for more intercalation or more reversibility of intercalation of Li-ions than possible in the unmodified structure.

The data in Table 10 show a large reduction in the resistivity between sample R1 (comparative) and samples R2, R4, R5, R8, R9, R10, R11, R12, demonstrating the effect of the modification on improving electrical conductivity of the crystal structures through both cation exchange, oxygen deficiencies, and carbon coating.

The data in Table 11 shows a large reduction in the DCIR/ASI from sample R1 (comparative) to samples R2, R4, R8, R10, R11 and R12, reflecting the trends shown in Table 10.

In Table 12, across most samples there is a trend for improved specific capacities, initial Coulombic efficiencies (ICE), nominal lithiation voltage vs Li/Li$^+$, and capacity retention at 5C and 10C vs 0.5C for modified materials versus the comparative 'base' materials (e.g. samples R1, R8). For example samples R2, R3, R4, R5, R8, R9, R10, R11, R12 all demonstrate improvements in one or more of these parameters vs sample R1. This is also the case for sample R7 versus R6 where ICE and capacity retention are improved.

Figure 8:
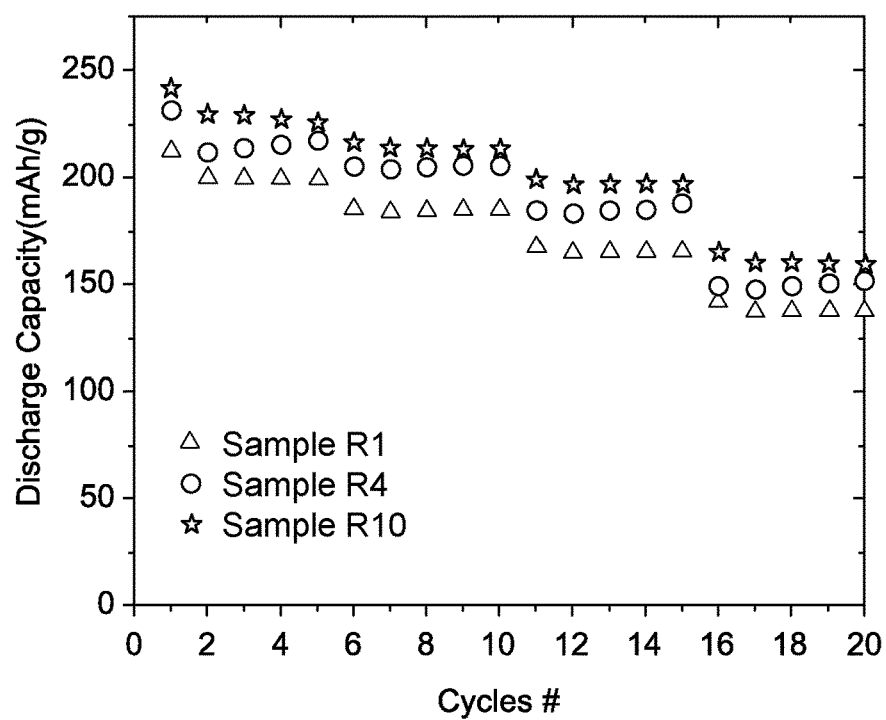
FIG. 8 shows lithiation and delithiation capacity obtained by galvanostatic cycling in half cell configuration, 1.1-3.0 V voltage window, at current densities of 0.5C, 1C, 2C, 5C (seen as step-changes in the data) for samples R1, R4, and R10 of Reference Examples—Set B

FIG. 8 demonstrate improved capacity retention at higher cycling rates for modified materials (samples R4, R10) versus the comparative material (sample R1).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

The invention claimed is:

1. An active electrode material comprising a mixture of (a) at least one niobium oxide and (b) at least one mixed niobium oxide, wherein the active electrode material does not comprise lithium titanate;
wherein the mixed niobium oxide has the composition M1$_a$M2$_{1-a}$M3$_b$Nb$_{12-b}$O$_{33-c-d}$Q$_d$, 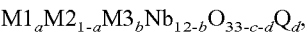
wherein:
M1 and M2 are different;
M1 is selected from Mg, Ti, Zr, Hf, V, Nb, Ta, Cr, Mo, W, Mn, Fe, Co, Ni, Cu, Zn, Cd, B, Al, Ga, Si, Sn, P, and mixtures thereof;
M2 is Mo or W;
M3 is selected from Mg, Ti, Zr, Hf, V, Ta, Cr, Mo, W, Mn, Fe, Co, Ni, Cu, Zn, Cd, B, Al, Ga, Si, Sn, P, and mixtures thereof;
Q is selected from F, Cl, N, S, and mixtures thereof;
0 ≤ a < 0.5; 0 ≤ b ≤ 2; −0.5 ≤ c ≤ 1.65; 0 ≤ d ≤ 1.65;
one or more of a, b, c and d does not equal zero; and
when a, b, and d equal zero, c is greater than zero;

wherein
(i) a>0 and M1 comprises an ion having a valency of +4 or less; and/or
(ii) b>0 and M3 comprises an ion having a valency of +4 or less; and
wherein the niobium oxide is in particulate form, wherein the niobium oxide has a $D_{50}$ particle diameter in the range of 0.1-100 μm.

2. The active electrode material of claim 1, wherein
(i) a>0; and/or
(ii) 0≤ a≤ 0.45.

3. The active electrode material of claim 1, wherein
(i) b>0; and/or
(ii) 0≤ b≤ 1.0.

4. The active electrode material of claim 1, wherein
(i) c≠0; or
(ii) 0≤ c≤ 1.65.

5. The active electrode material of claim 1, wherein
(i) d>0; and/or
(ii) 0≤d≤ 1.0.

6. The active electrode material of claim 1, wherein M1 is selected from Mg, Ti, Zr, V, Nb, Cr, Mo, W, Mn, Fe, Co, Ni, Cu, Zn, Cd, B, Al, Si, P, and mixtures thereof.

7. The active electrode material of claim 1, wherein M2 is Mo.

8. The active electrode material of claim 1, wherein M3 is selected from Mg, Ti, Zr, V, Cr, Mo, W, Mn, Fe, Co, Ni, Cu, Zn, Cd, B, Al, Si, P, and mixtures thereof.

9. The active electrode material of claim 1, wherein M1 does not comprise Nb and wherein M3 does not comprise Mo and/or W.

10. The active electrode material of claim 1, wherein Q is selected from F, N, and mixtures thereof.

11. The active electrode material according to claim 1, wherein the mixed niobium oxide is oxygen deficient.

12. The active electrode material according to claim 1, wherein the mixed niobium oxide is coated with carbon.

13. The active electrode material according to claim 12, wherein the carbon coating comprises polyaromatic $sp^2$ carbon.

14. The active electrode material according to claim 1, wherein the mixed niobium oxide is in particulate form, wherein the mixed niobium oxide has a $D_{50}$ particle diameter in the range of 0.1-100 μm.

15. The active electrode material according to claim 1, wherein the mixed niobium oxide has a BET surface area in the range of 0.1-100 $m^2/g$.

16. The active electrode material according to claim 1, wherein the crystal structure of the mixed niobium oxide as determined by X-ray diffraction corresponds to the crystal structure of one or more of $MoNb_{12}O_{33}$ or $WNb_{12}O_{33}$.

17. The active electrode material according to claim 1, wherein
(i) the ratio by mass of (a):(b) ranges from 0.5:99.5 to 99.5:0.5; and/or
(ii) the ratio by mass of (b):(a) is at least 1.5:1.

18. The active electrode material according to claim 1, wherein
(i) the niobium oxide comprises a material selected from $Nb_{12}O_{29}$, $NbO_2$, NbO, $Nb_2O_5$, and mixtures thereof; and/or;
(ii) at least 50 wt % of the niobium oxide is $Nb_2O_5$.

19. The active electrode material of claim 1, wherein the niobium oxide consists essentially of niobium and oxygen.

20. The active electrode material according to claim 1, wherein
(i) the niobium oxide comprises a niobium oxide doped with additional cations or anions that has a crystal structure corresponding to the crystal structure of an oxide consisting of Nb and O; and/or
(ii) the niobium oxide comprises an oxygen deficient niobium oxide; and/or
(iii) the niobium oxide comprises a coating.

21. The active electrode material according to claim 1, wherein
(i) the niobium oxide comprises a niobium oxide having the crystal structure of orthorhombic $Nb_2O_5$ or monoclinic $Nb_2O_5$; and/or
(ii) the niobium oxide comprises a niobium oxide having the crystal structure of H—$Nb_2O_5$.

22. The active electrode material according to claim 1, wherein the niobium oxide has a BET surface area in the range of 0.1-100 $m^2/g$.

23. The active electrode material according to claim 1, wherein the niobium oxide and/or the mixed niobium oxide further comprises Li and/or Na.

24. The active electrode material according to claim 1 comprising at least one other component; wherein the at least one other component is selected from a binder, a solvent, a conductive additive, a different active electrode material, and mixtures thereof.

25. An electrode comprising the active electrode material of claim 1 in electrical contact with a current collector.

26. An electrochemical device comprising an anode, a cathode, and an electrolyte disposed between the anode and the cathode, wherein the anode comprises an active electrode material according to claim 1; wherein the electrochemical device is a lithium-ion battery or a sodium-ion battery.

27. An active electrode material comprising a mixture of (a) at least one niobium oxide and (b) at least one mixed niobium oxide, wherein the active electrode material does not comprise lithium titanate;
wherein the mixed niobium oxide has the composition $M1_aM2_{1-a}M3_bNb_{12-b}O_{33-c-d}Q_d$,
wherein:
M1 and M2 are different;
M1 is selected from Mg, Ti, Zr, Hf, V, Nb, Ta, Cr, Mo, W, Mn, Fe, Co, Ni, Cu, Zn, Cd, B, Al, Ga, Si, Sn, P, and mixtures thereof;
M2 is Mo or W;
M3 is selected from Mg, Ti, Zr, Hf, V, Ta, Cr, Mo, W, Mn, Fe, Co, Ni, Cu, Zn, Cd, B, Al, Ga, Si, Sn, P, and mixtures thereof;
Q is selected from F, Cl, N, S, and mixtures thereof;
0≤a<0.5; 0≤b≤ 2; −0.5≤c≤ 1.65; 0≤ d≤ 1.65;
one or more of a, b, c and d does not equal zero; and
when a, b, and d equal zero, c is greater than zero;
wherein
(i) a>0 and M1 comprises an ion having a valency of +4 or less; and/or
(ii) b>0 and M3 comprises an ion having a valency of +4 or less; and
wherein the niobium oxide has a BET surface area in the range of 0.1-100 $m^2/g$.

* * * * *